(12) United States Patent
Schlenoff et al.

(10) Patent No.: US 8,586,018 B1
(45) Date of Patent: Nov. 19, 2013

(54) THIN FILMS FOR CONTROLLED PROTEIN INTERACTION

(71) Applicant: Florida State University Research Foundation, Inc., Tallahassee, FL (US)

(72) Inventors: Joseph B. Schlenoff, Tallahassee, FL (US); Zhijie Sui, Tucson, AZ (US); David S. Salloum, Blue Ash, OH (US); Hassan Rmaile, Stillwater, MN (US)

(*) Notice: Subject to any disclaimer, the term of this patent is extended or adjusted under 35 U.S.C. 154(b) by 0 days.

(21) Appl. No.: 13/931,311

(22) Filed: Jun. 28, 2013

Related U.S. Application Data

(62) Division of application No. 11/063,952, filed on Feb. 23, 2005, now Pat. No. 8,481,017.

(60) Provisional application No. 60/546,911, filed on Feb. 23, 2004.

(51) Int. Cl.
*A61K 31/74* (2006.01)

(52) U.S. Cl.
USPC .................................................. 424/78.1

(58) Field of Classification Search
None
See application file for complete search history.

(56) References Cited

U.S. PATENT DOCUMENTS

| | | | |
|---|---|---|---|
| 3,467,604 A | 9/1969 | MIchaels | |
| 4,169,023 A | 9/1979 | Sata et al. | |
| 4,501,835 A | 2/1985 | Berke | |
| 4,654,235 A | 3/1987 | Effenberger et al. | |
| 5,711,915 A | 1/1998 | Siegmund et al. | |
| 5,807,636 A | 9/1998 | Sheu et al. | |
| 6,402,918 B1 | 6/2002 | Schlenoff et al. | |
| 6,451,871 B1 | 9/2002 | Winterton et al. | |
| 6,468,657 B1 | 10/2002 | Hou et al. | |
| 6,610,789 B2 | 8/2003 | Watakabe et al. | |
| 6,699,501 B1 | 3/2004 | Neu et al. | |
| 6,743,521 B2 | 6/2004 | Hubbell et al. | |
| 6,841,054 B2 | 1/2005 | Schlenoff et al. | |
| 7,205,270 B2 | 4/2007 | Delplancke et al. | |
| 2002/0053514 A1 | 5/2002 | Locascio et al. | |
| 2002/0130045 A1 | 9/2002 | Schlenoff et al. | |
| 2003/0157269 A1 | 8/2003 | Ratner et al. | |
| 2003/0219384 A1 | 11/2003 | Donath et al. | |

(Continued)

FOREIGN PATENT DOCUMENTS

| | | |
|---|---|---|
| WO | 99/35520 | 7/1999 |
| WO | 0044928 | 8/2000 |
| WO | 03/099835 | 12/2003 |
| WO | 03/101494 | 12/2003 |

OTHER PUBLICATIONS

Stroeve, P., et al., "Gas Transfer in Supported Films Made by Molecular Self-Assembly of Ionic Polymers," Thin Solid Films 284-285, 1996, pp. 708-712.

(Continued)

*Primary Examiner* — Paul Dickinson

(57) ABSTRACT

A medium for isolating or releasing an electrostatically charged component from or into an aqueous composition. The medium has a polyelectrolyte film on at least one surface of an article wherein the polyelectrolyte film is characterized by an interpenetrating network of a predominantly positively charged polymer and a predominantly negatively charged polymer. The predominantly positively charged polymer, the predominantly negatively charged polymer or both contain (i) a pH sensitive imidazole repeat unit having a pKa between 3 and 9, or (ii) a redox sensitive repeat unit selected from the group consisting of quaternized bipyridine repeat units, coordinated metal repeat units, pyrrole repeat units, aniline repeat units, thiophene repeat units and combinations thereof having a redox potential between +1.2 volts and −1.2 volts versus a standard hydrogen electrode.

20 Claims, 11 Drawing Sheets

(56) References Cited

U.S. PATENT DOCUMENTS

| | | |
|---|---|---|
| 2004/0022691 A1 | 2/2004 | Allen et al. |
| 2004/0044100 A1 | 3/2004 | Schlenoff et al. |
| 2004/0060481 A1 | 4/2004 | Schlenoff |
| 2004/0084312 A1 | 5/2004 | Warner et al. |
| 2004/0137039 A1 | 7/2004 | Sukhishvili et al. |
| 2004/0149572 A1 | 8/2004 | Schlenoff et al. |
| 2004/0265603 A1 | 12/2004 | Schlenoff |
| 2005/0025675 A1 | 2/2005 | Schlenoff et al. |

OTHER PUBLICATIONS

Sui, Z., et al., "Controlling Electroosmotic Flow in Microchannels with pH-Responsive Polyelectrolyte Multilayers," Langmuir, Aug. 19, 2003, pp. 7829-7831, vol. 19, No. 19.
Sukhishvili, S.A., et al., "Layered, Erasable Polymer Multilayers Formed by Hydrogen-Bonded Sequential Self-Assembly," Macromolecules, 2002, pp. 301-310, vol. 35, No. 1.
Szleifer, I., "Polymers and Proteins: Interactions at Interfaces," Biomaterials, 1997, pp. 337-344.
Thierry, B., et al., "Bioactive Coatings of Endovascular Stents Based on Polyelectrolyte Multilayers," Biomacromolecules, Oct. 7, 2003, pp. 1564-1571, vol. 4, No. 6.
Tieke, B., et al., "Ultrathin Self-Assembled Polyelectrolyte Multilayer Membranes," The European Physical Journal E, 2001, pp. 29-39, vol. 5.
Yoo, D., et al., "Controlling Bilayer Composition and Surface Wettability of Sequentially Absorbed Multilayers of Weak Polyelectrolytes," Macromolecules, 1998, pp. 4309-4318, vol. 31, No. 13.
Zou, H., et al., "Monolithic Stationary Phases for Liquid Chromatography and Capillary Electrochromatography," Journal of Chromatography A, 2002, pp. 5-32, vol. 954.
Cheng, Y., et al., "Ultrathin Polypeptide Multilayer Films for the Fabrication of Model Liquid/Liquid Electrochemical Interfaces," J. Phys. Chem. B 1999, pp. 8726-8731, vol. 103, No. 41, Published Sep. 18, 1999.
Hoogeveen et al., Formation and Stability of Multilayers of Polyelectrolytes, Langmuir, 1996, 12, 3675-3681.
Bohmer et al., Adsorption of partially quarternised poly(vinyl imidazoles) onto SiO2 and Y2O3, Colloids and Surfaces A, 1995, 99, 53-64.
Sui et al., Controlling Electroosmotic Flow Microchannels with pH-Responsive Polyelectrolyte Multilayers, Langmuir, 2003, 19, 7829-7831.
Mamedov et al., Molecular design of single-wall carbon nanotube/polyelectrolyte multilayer composites, Nature Materials, 2002, 1, 190-194.
Overberger et al, Esterolytic Activity of Imidazole-Containing Polymers. Synthesis and Characterization of Copoly[1-alkyl-4- or 5-Vinylimidazole/4(5)-Vinylimidazole] and Its Catalytic Activity in the Hydrolysis of p-Nitrophenyl Acetate, J. Polym. Sci., 1978, 16, 1237-1248.
Berg, M.C., et al., "Controlling Mammalian Cell Interactions on Patterned Polyelectrolyte Multilayer Surfaces," Langmuir, Jan. 13, 2004, pp. 1362-1368, vol. 20, No. 4.
Caruso, F., et al., "Assembly of Alternating Polyelectrolyte and Protein Multilayer Films for Immunosensing," Langmuir, 1997, pp. 3427-3433, vol. 13, No. 13.
Chen, W., et al., "Layer-by-Layer Deposition: A Tool for Polymer Surface Modification," Macromolecules, 1997, pp. 78-86, vol. 30, No. 1.
Chluba, J., et al., "Peptide Hormone Covalently Bound to Polyelectrolytes and Embedded into Multilayer Architectures Conserving Full Biological Activity," Biomacromolecules, 2001, pp. 800-805, vol. 2, No. 3.
Dai, J., et al., "Controlling the Permeability of Multilayered Polyelectrolyte Films Through Derivatization, Cross-Linking, and Hydrolysis," Langmuir, 2001, pp. 931-937, vol. 17, No. 3.

Decher, G., "Fuzzy Nanoassemblies: Toward Layered Polymeric Multicomposites," Science, Aug. 29, 1997, pp. 1232-1237, vol. 277.
Decher, G., "Polyelectrolyte Multilayers, An Overview," Multilayer Thin Films, 2002, pp. 1-46.
Dubas, S.T., et al., "Swelling and Smoothing of Polyelectrolyte Multilayers by Salt," Langmuir, 2001, pp. 7725-7727, vol. 17, No. 25.
Durstock, M.F., et al., "Dielectric Properties of Polyelectrolyte Multilayers," Langmuir, 2001, pp. 7865-7872, vol. 17, No. 25.
Elbert, Di., et al., "Thin Polymer Layers Formed by Polyelectrolyte Multilayer Techniques on Biological Surfaces," Langmuir, 1999, pp. 5355-5362, vol. 15, No. 16.
Fou, A.C., et al., "Fabrication and Properties of Light-Emitting Diodes Based on Self-Assembled Multilayers of Poly (phenylene vinylene)," J. Appl. Phys., May 15, 1996, pp. 7501-7509, vol. 79, No. 10.
Hammond, P.T., et al., "Formation of Polymer Microstructures by Selective Deposition of Polyion Multilayers Using Patterned Self-Assembled Monolayers as a Template," Macromolecules, 1995, pp. 7569-7571, vol. 28, No. 22.
Harris, J.J., et al., "Electrochemical and in Situ Ellipsometric Investigation of the Permeability and Stability of Layered Polyelectrolyte Films," Langmuir, 2000, pp. 2006-2013, vol. 16, No. 4.
Harris, J.J., et al., "Layered Polyelectrolyte Films as Selective, Ultrathin Barriers for Anion Transport," Chem. Mater., 2000, pp. 1941-1946, vol. 12, No. 7.
Harris, J.J., et al., "Synthesis of Passivating, Nylon-like Coatings Through Cross-Linking of Ultrathin Polyelectrolyte Films," Journal of the American Chemical Society, 1999, pp. 1978-1979, vol. 121, No. 9.
Hoogeveen, N. G., et al., "Formation and Stability of Multilayers of Polyelectrolytes," Langmuir, 1996, pp. 3675-3681, vol. 12, No. 15.
Hsieh, M.C., et al., "Surface "Priming" for Layer-by-Layer Deposition: Polyelectrolyte Multilayer Formation on Allylamine Plasma-Modified Poly(tetrafluoroethylene)," Macromolecules, 1997, pp. 8453-8458, vol. 30, No. 26.
Huck, W.T.S., et al., "Patterned Polymer Multilayers as Etch Resists," Langmuir, 1999, pp. 6862-6867, vol. 15, No. 20.
Ichinose, I., et al., "Electrostatic Absorption of Cytochrome c on Ultrathin ZrO2-Gel Layers and Preparation of Alternate Multilayers," Langmuir, 2003, pp. 3883-3888, vol. 19, No. 9.
Jiang, Z., et al., "Selective Deposition in Layer-by-Layer Assembly: Functional Graft Copolymers as Molecular Templates," Langmuir, 2000, pp. 8501-8509, vol. 16, No. 22.
Kozlovskaya, V., et al., "Hydrogen-Bonded Polymer Capsules Formed by Layer-by-Layer Self-Assembly," Macromolecules, 2003, pp. 8590-8592, vol. 36, No. 23.
Krasemann, L., et al., "Selective Ion Transport Across Self-Assembled Alternating Multilayers of Cationic and Anionic Polyelectrolyes," Langmuir, 2000, pp. 287-290, vol. 16, No. 2.
Ladam, G., et al., "Protein Absorption onto Auto-Assembled Polyelectrolyte Films," Langmuir, 2001, pp. 878-882, vol. 17, No. 3.
Ladam, G., et al., "Protein Interactions with Polyelectrolyte Multilayers: Interactions Between Human Serum Albumin and Polystyrene Sulfonate/Polyallylamine Multilayers," Biomacromolecules, Oct. 21, 2000, pp. 674-687, vol. 1, No. 4.
Lahav, M., et al., "Tailored Chemosensors for Chloroaromatic Acids Using Molecular Imprinted TiO2 Thin Films on Ion-Sensitive Field-Effect Transistors," Analytical Chemistry, Feb. 1, 2001, pp. 720-723, vol. 73, No. 3.
Laurent, D., et al., "Multilayer Assemblies of Redox Polyelectrolytes," Langmuir, 1997, pp. 1552-1557, vol. 13, No. 6.
Lvov, Y., et al., "Assembly of Multicomponent Protein Films by Means of Electrostatic Layer-by-Layer Absorpotion," Journal of the American Chemical Society, 1995, pp. 6117-6123, vol. 117, No. 22, American Chemical Society.
Lvov, Y., et al., "Biocolloids with Ordered Urease Multilayer Shells as Enzymatic Reactors," Analytical Chemistry, Sep. 1, 2001, pp. 4212-4217, vol. 73, No. 17.
Lvov, Y.M., et al., "Direct Electrochemistry of Myoglobin and Cytochrome P450cam in Alternate Layer-by-Layer Films with DNA and Other Polyions," Journal of the American Chemical Society, 1998, pp. 4073-4080, vol. 120, No. 17, American Chemical Society.

(56) References Cited

OTHER PUBLICATIONS

Mamedov, A.A., et al., "Free-Standing Layer-by-Layer Assembled Films of Magnetite Nanoparticles," Langmuir, 2000, pp. 5530-5533, vol. 16, No. 13.

Matthews, J. R., et al., "Surfaces Designed for Charge Reversal," Journal of the American Chemical Society, 2003, pp. 6428-6433, vol. 125, No. 21, American Chemical Society.

Mendelsohn, J.D., et al., "Fabrication of Microporous Thin Films from Polyelectrolyte Multilayers," Langmuir, 2000, pp. 5017-5023, vol. 16, No. 11.

Mendelsohn, J. D., et al., "Rational Design of Cytophilic and Cytophobic Polyelectrolyte Multilayer Thin Films," Biomacromolecules, 2003, pp. 96-106, vol. 4, No. 1.

Möhwald, H., et al., "Smart Capsules," Multilayer Thin Films, 2002, pp. 363-392.

Mrksich, M., et al., "Surface Plasmon Resonance Permits in Situ Measurement of Protein Absorption on Self-Assembled Monolayers of Alkanethiolates on Gold," Langmuir, 1995, pp. 4383-4385, vol. 11, No. 11.

Müller, M., et al., "Deposition and Properties of Polyelectrolyte Multilayers Studied by ATR-FTIR Spectroscopy," Materials Science and Engineering, 1999, pp. 163-169, C 8-9.

Müller, M., et al., "Polyelectrolyte Complex Layers: A Promising Concept for Anti-Fouling Coatings Verified by in-situ situ ATR-FTIR Spectroscopy," Macromolecular Rapid Communications, 1999, pp. 607-611, vol. 20.

Müller, M., et al., "Selective Interaction Between Proteins and the Outermost Surface of Polyelectrolyte Multilayers: Influence of the Polyanion Type, pH and Salt," Macromolecular Rapid Communications, 2001, pp. 390-395, vol. 22.

Onda, M., et al., "Sequential Actions of Glucose Oxidase and Peroxidase in Molecular Films Assembled by Layer-by-Layer Alternate Absorption," Biotechnology and Bioengineering, 1996, pp. 163-167, vol. 51, No. 2.

Overberger, C.G., et al., "Imidazole-containing Polymers. Synthesis and Polymerization of the Monomer 4(5)-Vinylimidazole," Journal of the American Chemical Society, Apr. 5, 1963, pp. 951-955.

Pei, R., et al., "Assembly of Alternating Polycation and DNA Multilayer Films by Electrostatic Layer-by-Layer Absorption," Biomacromolecules, 2001, pp. 463-468, vol. 2, No. 2.

Raposo, M., et al., "Absorption Mechanisms in Layer-by-Layer Films," 1998, 13 pages.

Richert, L., et al., "Cell Interactions with Polyelectrolyte Multilayer Films," Biomacromolecules, 2002, pp. 1170-1178, vol. 3, No. 6.

Richert, L., et al., "Layer by Layer Buildup of Polysaccharide Films: Physical Chemistry and Cellular Adhesion Aspects," Langmuir, 2004, pp. 448-458, vol. 20, No. 2.

Rosidian, A., et al., "Ionic Self-Assembly of Ultrahard ZrO2/Polymer Nanocomposite Thin Films," Advanced Materials, 1998, pp. 1087-1091, vol. 10, No. 14.

Salloum, D.S., et al., "Protein Absorption Modalities on Polyelectrolyte Multilayers," Biomacromolecules, 2004, pp. 1089-1096, vol. 5, No. 3.

Schlenoff, J.B., et al., "Sprayed Polyelectrolyte Multilayers," Langmuir, 2000, pp. 9968-9969, vol. 16, No. 26.

Schwinté, P., et al., "Stabilizing Effects of Various Polyelectrolyte Multilayer Films on the Structure of Absorbed/Embedded Fibrinogen Molecules: An ATR-FTIR Study," J. Phys. Chem. B, 2001, pp. 11906-11916, vol. 105, No. 47.

Serizawa, T., et al., "Alternating Bioactivity of Polymeric Layer-by-Layer Assemblies: Anticoagulation vs Procoagulation of Human Blood," Biomacromolecules, 2002, pp. 724-731, vol. 3, No. 4.

Stepp, J., et al., "Electrochromism and Electrocatalysis in Viologen Polyelectrolyte Multilayers," Journal of the Electrochemical Society, Jun. 1997, pp. L155-L157, vol. 144, No. 6.

THIN FILMS FOR CONTROLLED PROTEIN INTERACTION

CROSS-REFERENCE TO RELATED APPLICATIONS

This application is a divisional of U.S. patent application Ser. No. 11/063,952, filed Feb. 23, 2005, which claims priority to U.S. Patent Application Ser. No. 60/546,911, filed Feb. 23, 2004, which is incorporated herein by reference in its entirety.

STATEMENT REGARDING FEDERALLY SPONSORED RESEARCH

This invention was made with Government support under Grant DMR 9727717 awarded by the National Science Foundation. The Government has certain rights in this invention.

BACKGROUND OF THE INVENTION

This invention relates generally to ultrathin polymeric membranes. More specifically, the invention relates to polyelectrolyte multilayer films on substrates, and the variations of surface properties of such films to control surface sorption of charged molecules into or onto such films.

Recently, ultrathin polymeric membranes have been prepared using charged polymers, or polyelectrolytes, which are alternately deposited on a substrate or substratum. See Decher and Schlenoff, Eds., *Multilayer Thin Films—Sequential Assembly of Nanocomposite Materials*, Wiley-VCH, Weinheim (2003); Decher, *Science* 277, 1232 (1997); and Decher, Hong, and Schmitt, *Thin Solid Films* 210/211, 831 (1992). For example, a buildup of multilayers may be accomplished by alternating dipping, i.e., cycling a substrate between two reservoirs containing aqueous solutions of polyelectrolytes of opposite charge, with an optional rinse step in polymer-free solution following each immersion. Each cycle adds a layer of polymer via electrostatic forces to the oppositely-charged surface and reverses the surface charge thereby priming the film for the addition of the next layer. Films prepared in this manner tend to be uniform, follow the contours and irregularities of the substrate, and are typically between about 10 nm and about 10,000 nm thick. The thickness of a film depends on many factors, including the number of layers deposited, the ionic strength of the solutions, the types of polymers, the deposition time, the solution pH, the temperature, and the solvent used. Although studies have shown that the substantial interpenetration of the individual polymer layers results in little composition variation over the thickness of a film, such polymer thin films are, nevertheless, referred to as polyelectrolyte multilayers (PEMUs). Though recently developed, PEMUs are being used in a wide variety of fields including light emitting devices, nonlinear optics, sensors, enzyme active thin films, electrochromics, conductive coatings, patterning, anticorrosion coatings, antistatic coatings, lubricating films, biocompatibilization, dialysis, and as selective membranes for the separation of gaseous and dissolved ionic species. See Fou et al., J. Appl. Phys. 79, 7501 (1996); Decher et al., J. Biosens. Bioelect. 9, 677 (1994); Sun et al., Macromol. Chem. Phys. 197, 147 (1996); Onda et al., Biotech Bioeng 51, 163 (1996); Lvov et al., J. Am. Chem. Soc. 120, 40733 (1998); Laurent et al., Langmuir 13, 1552 (1997); Stepp et al., J. Electrochem. Soc. 144, L155 (1997); Cheung et al., Thin Solid Films 244, 985 (1994); Hammond et al., Macromolecules 28, 7569 (1995); Huck et al., Langmuir 15, 6862 (1999); Stroeve et al., Thin Solid Films 284, 708 (1996); Levasalmi et al., Macromolecules 30, 1752 (1997); Harris et al., Langmuir 16, 2006 (2000); Krasemann et al., 16, 287 (2000); Harris et al., J. Am. Chem. Soc. 121, 1978 (1999); Harris et al., Chem. Mater. 12, 1941 (2000). In fact, PEMUs are particularly suited for use as selective membranes because they are uniform, rugged, easily prepared on a variety of substrates, continuous, resistant to protein adsorption, have reproducible thicknesses, may be made very thin to allow high permeation rates, and may be made from a wide range of compositions. The resulting PEMU systems may be used in applications employing charge reversal for hosting/releasing natural and synthetic compositions such as polypeptides (e.g., proteins), dyes, pharmaceuticals, and the like. See, e.g., Matthews, J. R.; Tuncel, D.; Jacobs, R. M.; Bain, C. D.; Anderson, H. L. *J. Am. Chem. Soc.* 2002, 125, 6428-6433. See also Harper et al. (PCT Application Publication Number WO 03/101494 A1), which discloses polyion films that, on switching their charge by changing solution pH, also release charged molecules. In trapping and release of charged molecules, it is generally desired that the efficiency of release be maximized, that is, as much of the trapped material as possible should be released in the release step.

Biofunctional thin films with controlled bulk or surface properties have been made by the alternating adsorption of synthetic and/or natural macromolecules to various substrates. (See Decher, G., Schlenoff, J. B. *Multilayer Thin Films—Sequential Assembly of Nanocomposite Materials*; Wiley-VCH: Weinheim, Germany, 2003.) The wide variety of charged nanocomponents incorporated into these "polyelectrolyte multilayers" (PEMUs) includes biomolecules such as DNA, immunoglobulin, glucose oxidase, and cytochrome c. These biomolecular thin films offer applications as biosensors, nano-filtration, bioreactors, and protein capsules. See Lvov, Y., Möhwald, H. *Protein Architecture: Interfacial Molecular Assembly and Immobilization Biotechnology*; Marcel Dekker: New York, 2000, Pei, R. J.; Cui, X. Q.; Yang, X. R.; Wang, E. K. *Biomacromolecules* 2001, 2, 463-468, Caruso, F.; Niikura, K.; Furlong, D. N.; Okahata, Y. *Langmuir* 1997, 13, 3427-3433, Lvov, Y.; Ariga, K.; Ichinose, I.; Kunitake, T. *J. Am. Chem. Soc.* 1995, 117, 6117-6123, Ichinose, I.; Takaki, R.; Kuroiwa, K.; Kunitake, T. *Langmuir* 2003, 19, 3883-3888, Lahav, M.; Kharitonov, A. B.; Katz, O.; Kunitake, T.; Willner, I. Anal. Chem. 2001, 73, 720-723, Tieke, B.; van Ackern, F.; Krasemann, L.; Toutianoush, A. *Eur. Phys. J. E.* 2001, 5, 29-39, Onda, M.; Lvov, Y.; Ariga, K.; Kunitake, T. *Biotechnol. Bioeng.* 1996, 51, 163-167, and Lvov, Y.; Caruso, F. *Anal. Chem.* 2001, 73, 4212-4217. Although multiple "electrostatic" interactions between synthetic and natural charged polymers might be presumed to modify protein conformations, individual interactions are actually quite weak, and, under certain conditions, proteins embedded into PEMUs during the buildup process maintain a secondary structure close to their native form, which renders such PEMUs bioactive. See Dubas, S. T.; Schlenoff, J. B. *Langmuir* 2001, 17, 7725-7727 and Schwinte, P.; Voegel, J. C.; Picart, C.; Haikel, Y.; Schaaf, P.; Szalontai, B. *J. Phys. Chem. B* 2001, 105, 11906-11916.

A recent area of interest addresses protein interactions with multilayer-coated surfaces. Fine tuning of protein adsorption at the solid/liquid interface is critical in certain areas of materials science and biomedical engineering. See Horbett, T. A. *Acs Sym. Ser.* 1995, 602, 1-23. Systems for delivery or biosensors, for example, bear modified surfaces designed to enhance or minimize protein adsorption. See Elbert, D. L.; Hubbell, J. A. *Annu. Rev. Mater. Sci.* 1996, 26, 365-394 and Szleifer, I. *Curr. Opin. Solid St. M.* 1997, 2, 337-344. The latter goal is generally desirable for blood-contacting devices, chromatographic supports, contact lenses, and immunoassays, to name a few. Due to their ease of use and water compatibility, PEMUs have been investigated as surface-modifying agents for protein interactions. See Muller, M.; Rieser, T.; Köthe, M.; Kessler, B.; Brissova, M.; Lunkwitz, K. *Macromol. Symp.* 1999, 145, 149-159, Müller, M.; Brissova, M.; Rieser, T.; Powers, A. C.; Lunkwitz, K. *Materials Science & Engineering C-Biomimetic and Supramolecular Systems* 1999, 8-9, 163-169, Müller, M.; Rieser, T.; Lunkwitz, K.; Meier-Haack, J. *Macromolecular Rapid Communications* 1999, 20, 607-611, Ladam, G.; Gergely, C.; Senger, B.; Decher, G.; Voegel, J. C.; Schaaf, P.; Cuisinier, F. J. G. *Biomacromolecules* 2000, 1, 674-687, (21) Ladam, G.; Schaaf, P.; Cuisinier, F. J. G.; Decher, G.; Voegel, J. C. *Langmuir* 2001, 17, 878-882, Müller, M.; Rieser, T.; Dubin, P. L.; Lunkwitz, K. *Macromolecular Rapid Communications* 2001, 22, 390-395. Since protein adsorption triggers further cellular or tissue responses, it is important to study the mechanism by which proteins adsorb onto these thin films. Interactions of more biocomplex systems, such as cells, with PEMUs, a topic of more recent interest, were studied, and different designs for cytophilic/cytophobic PEMUs has been proposed. See Richert, L.; Lavalle, P.; Vautier, D.; Senger, B.; Stoltz, J. F.; Schaaf, P.; Voegel, J. C.; Picart, C. *Biomacromolecules* 2002, 3, 1170-1178 and Mendelsohn, J. D.; Yang, S. Y.; Hiller, J.; Hochbaum, A. I.; Rubner, M. F. *Biomacromolecules* 2003, 4, 96-106.

Separation and purification of proteins is often accomplished by ionic exchange chromatography (IEC), which relies on electrostatic interactions between proteins and charged groups on a stationary phase or support. IEC is the most popular chromatographic technique in protein purification, accounting for about 40% of the chromatographic steps included in purification protocols. See Wheelwright, S. M. *Protein Purification: Design and Scale-Up of Downstream Processing*; Hanser: Munich, Germany, 1991 and Choudhary, G.; Horvath, C. Ion exchange chromatography. *Methods Enzymol.* 1996, 43, 47-82. Ion exchange, also known as ion displacement, chromatography, offers high resolving power, and high protein-binding capacity.

Ion exchange chromatography typically employs a column (column chromatography) or a plate (thin layer chromatography) filled or coated, respectively, with material having affinity for the protein. A solution containing the protein is passed through the column or imbibed into one edge of the thin later, respectively. In batch separation/purification mode, proteins adhere to the stationary phase, and those species having lower affinity for the stationary phase do not. Immobilized proteins are then released from the column using a chemical or physical stimulus. In column chromatographic purification mode, a solution termed the "mobile" phase is passed continuously though the column and a complex mixture comprising two or more components to be separated is introduced at the head of the column. The components exhibit different degrees of interaction with the stationary phase, such that components travel at different speeds down the column. In a successful separation, components elute at different times from the column and may be detected for the purposes of qualitative and quantitative analysis, or, where purification is the major goal, may be collected for further use. If the stationary phase is present as a thin layer, usually supported on a plate, mixtures are introduced to one edge of the layer and mobile phase is imbibed continually into this edge, transporting components up the layer.

Column batch mode is advantageous because of its simplicity and the fact that loadings, indicated by gram of protein per gram of stationary phase, of material to be purified are greater than in column chromatographic mode. Thus, if large quantities of purified material are desired using column chromatography, many column chromatographic runs must be performed on small aliquots, or extremely large diameter columns must be employed, to obtain protein in quantity. On the other hand, column chromatographic mode offers better resolution between multiple components. In the pharmaceutical industry, commercially important materials, including large and small molecules, such as drugs, are often separated chromatographically by large columns. It is economically viable to do so because the product commands a very high premium.

In column batch mode, and in chromatographic mode, the material with which protein interacts is frequently coated on particulate support that is then packed into the column. Alternatively, the column is filled with a polymer or an inorganic mixture which may be turned into a solid, porous material, which is known as a "monolithic" column. See Zou et al., *Monolithic stationary phased for liquid chromatography and capillary electrochromatography*, Journal of Chromatography A, 954, 5-32 (2002). The porous monolithic column may be coated with stationary phase.

In its simplest form, a batch separation may be performed by mixing the stationary phase with the mixture, allowing the components to be separated/purified to adhere, rinsing the undesired, non-adhering material away, then releasing the components of interest from the stationary phase. Column batch separation is advantageous because of the convenience of manipulating the solutions used for processing.

In some instances, a protein in solution may be considered pure but too dilute. Such a situation may arise during the course of protein isolation or purification using a series of steps including, but not limited to, dialysis through a semipermeable membrane. While it is possible to reduce the volume of solvent by evaporation, including "freeze drying," this may denature the protein. Adsorbing the protein from a certain volume of solution onto a stationary phase, then releasing it into a smaller volume is an effective way of concentrating or purifying it.

In batch separation mode, in order to release protein adsorbed to a stationary phase, a stimulus must be added that decreases the interaction of the protein with the stationary phase. Since the interaction between protein and stationary phase is often electrostatic, or charge-pairing, an effective way to remove protein from a stationary phase is to add ionic material, or "salt," which competes with the protein for the charged sites on the stationary phase. If sufficient salt is added, it occupies the charged adsorption sites on the stationary phase and protein is released. This mechanism may be thought of as ion exchange between salt ions and charged protein units, although the mechanism may also be explained in terms of electrostatic screening of attractive interactions between protein and stationary phase. A major disadvantage of the ion exchange mechanism for protein release is that it often requires large amounts of salt, which end up mixed with protein, to accomplish this. The salt may be removed with a dialysis step, but this adds additional time and inconvenience to the purification procedure. In addition, some proteins may be unstable in the presence of the concentration or type of salt required to release them from the stationary phase.

Alternatively, the interaction between protein and stationary phase may be controlled by the pH of the solution. The sign and magnitude of the charge on proteins depends on the solution pH, as the charge on proteins is carried by weak acids, such as carboxylates (—COOH), or weak bases, such as primary, secondary, and tertiary amines. Thus, at high pH (basic conditions) amines are deprotonated and neutral, and carboxylate groups are deprotonated and charged. For proteins, there is a pH at which there are equal numbers of positive and negative charges on the biomolecule, and it is thus electrically neutral. This is termed the isoelectric point, or pI. At pH above the isoelectric point, the protein has a net negative charge and at pH below pI, proteins bear a net positive charge. Proteins that tend to have a preponderance of positive charge at physiological pH are often termed "basic" proteins.

Assuming the stationary phase is relatively insensitive to pH, if interactions between oppositely-charged stationary phase and protein are largely electrostatic, it is reasoned that removal of a net charge on the protein will reduce or remove this interaction, and further change in pH will actually cause the protein to adopt the same charge as the stationary phase, leading to repulsion. Therefore, if pH change is to be used as a protein removal stimulus, a protein may be adsorbed to a stationary phase under pH conditions where the two have the opposite charge and therefore interact strongly. The pH is then changed to a value sufficient to reduce the charge, and therefore charge interaction, on the protein, releasing it from the stationary phase.

In column chromatographic mode it critical to control finely the interaction between species being separated and stationary phase. Often, the nature of the mobile phase passing through the column is changed by including a proportion of organic solvent. Since many biomolecules are potentially denatured, or degraded, in the presence of organic solvent, alternative ways must be found to fine-tune the interactions with the stationary phase. The addition of salt, or control of ionization of biomolecule or stationary phase by pH, again, offers methods for precise control of protein-stationary phase interaction. In column chromatographic separations, it is desired to elute different components at different times so that fractions containing the pure component may be isolated. At the same time, it is undesirable for the components to interact too strongly with the column, or they will take too much time to elute. The balance between separation efficiency and separation time is a classical tradeoff to be made in chromatographic separations. A system that allows fine control over biomolecule/stationary phase interactions is highly advantageous.

SUMMARY OF THE INVENTION

Among the various aspects of the present invention may be noted the provision of pH-sensitive and redox-sensitive PEMU coating systems, where the polarity and density of charge can be controlled by pH or applied potential. The resulting PEMU systems may be used in applications employing charge reversal for hosting/releasing natural and synthetic compositions such as polypeptides (e.g., proteins), dyes, pharmaceuticals, cells, cell fragments, viruses, viral fragments. Advantageously, the present invention provides a method for sorbing and releasing proteins and other electrostatically charged compositions with pH-sensitive and/or redox-sensitive surfaces wherein the pH or applied potential controlled elution is primarily achieved by changing the charge of the sorbent (stationary phase) rather than the sorbate (e.g., protein, dye, organic molecule, or virus).

Briefly, therefore, the present invention is directed to a medium for isolating or release an electrostatically charged component from or into an aqueous composition. The medium comprises a polyelectrolyte film coated material in the form of a membrane, mass of particulate material, or article other than a capillary tube wherein the polyelectrolyte film comprises an interpenetrating network of a predominantly positively charged polymer and a predominantly negatively charged polymer. The predominantly positively charged polymer, the predominantly negatively charged polymer or both contain (i) a pH sensitive imidazole repeat unit having a pKa between 3 and 9, or (ii) a redox sensitive repeat unit selected from the group consisting of quaternized bipyridine repeat units, coordinated metal repeat units, pyrrole repeat units, aniline repeat units, thiophene repeat units and combinations thereof having a redox potential between +1.2 volts and −1.2 volts versus a standard hydrogen electrode.

The present invention is further directed to a process for isolating an electrostatically charged component from a first aqueous composition, the process comprising contacting the first aqueous composition with a polyelectrolyte film to sorb the ionized component onto or into the polyelectrolyte film, wherein the polyelectrolyte film comprises an interpenetrating network of a predominantly positively charged polymer and a predominantly negatively charged polymer. In addition, the predominantly positively charged polymer, the predominantly negatively charged polymer or both contain (i) a pH sensitive imidazole repeat unit having a pKa between 3 and 9, or (ii) a redox sensitive repeat unit selected from the group consisting of quaternized bipyridine repeat units, coordinated metal repeat units, pyrrole repeat units, aniline repeat units, thiophene repeat units, and combinations thereof having a redox potential between +1.2 volts and −1.2 volts versus a standard hydrogen electrode.

Other objects and aspects of the invention will be in part apparent and in part pointed out hereinafter.

DETAILED DESCRIPTION OF THE PREFERRED EMBODIMENT(S)

Figure 1A:
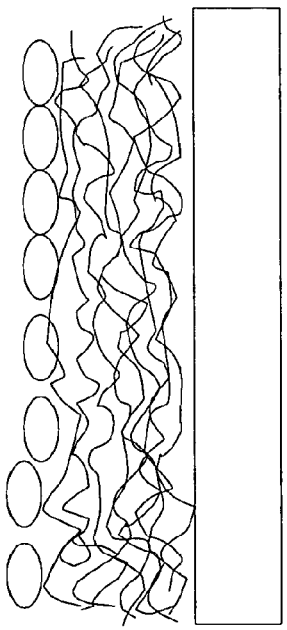
FIG. 1 is a schematic of protein adsorption onto/into PEMUs. 1A and 1B represent apparent monolayers, and 1C and 1D represent apparent multilayers.

Electrostatically charged compositions, i.e., compositions having a net negative or a net positive charge may be selectively sorbed from an aqueous composition onto or into a medium in accordance with the present invention for the purpose of purification or other separation or delivery of a composition under selected circumstances. The medium comprises a polyelectrolyte multilayer film containing at least one charged polymer having pH sensitive or redox sensitive units. By controlling pH (when the polyelectrolyte multilayer film contains pH sensitive units) or applied potential (when the polyelectrolyte multilayer film contains redox sensitive units), therefore, the medium can be made to attract or repel the electrostatically charged composition. As a result, the electrostatically charged composition can be sorbed onto or into the medium from an aqueous solution or emulsion at a first pH or applied potential and then desorbed into a second, or different aqueous composition, at a second pH or applied potential, respectively. Typically, the first and second pH's will differ by at least about 0.5 pH units (preferably at least 1.5 pH units) and the first and second applied potentials will differ by at least 0.1 volts (preferably at least 0.4 volts)

The electrostatically charged composition may be any of a wide range of compositions. For example, the electrostatically charged composition may be an electrostatically charged cell, e.g., a prokaryotic or eukaryotic cell, a fragment thereof, a virus, or a fragment thereof. Alternatively, the electrostatically charged composition may be an electrostatically charged organic molecule, e.g., an antibiotic or other pharmaceutical composition having therapeutic utility. The electrostatically charged composition may be an electrostatically charged polypeptide, for example, a glycosylated or non-glycosylated protein, a polypeptide or protein conjugate, for example, a protein conjugated to a reporter or tag (e.g., dye, enzyme, antibody, biotin, radioactive element and like), a hormone, a growth factor or an enzyme such as a peroxidase. The electrostatically charged composition may also be an electrostatically charged nucleic acid (RNA or DNA) having a relatively few bases, i.e., an oligonucleotide, or a longer polynucleotide. By way of further example, the electrostatically charged composition may be an electrostatically charged polysaccharide or even an electrostatically charged coordination complex, e.g., ferricyanide.

In general, the medium comprises an article, having a polyelectrolyte multilayer film as a coating on a surface thereof. The article may be a container, e.g., a reaction or storage vessel having a bottom and a sidewall formation; for example, the container may be one or more wells of a multiwell plate (e.g., 96, 394 or 1296 well microtiter or equivalent plate) or one or more regions of a two-dimensional array formed, for example, on an electronically conductive or non-conductive substrate of metal, plastic, glass or the like wherein each region may be individually electrically addressed by means of a probe. Alternatively, the article may be a membrane, a tube (e.g., a capillary tube) or mass of fibers. In a further embodiment, a particulate mass of a composition and size conventionally employed as a separations support may be coated with the polyelectrolyte multilayer film. In a further embodiment, the article is an implantable, indwelling medical device selected from the group consisting of heart valves, pacemakers, microspheres, artificial joints, intravenous catheters, intraarterial catheters, gastrointestinal tubes, intrauterine devices, diaphragms, urinary catheters, stents, shunts, and contact lenses. Typically, the polyelectrolyte multilayer film will have a thickness of about 10 to 1,000 nanometers, more typically about 100 nanometers and will be deposed upon at least one surface of the article.

Figure 1B:
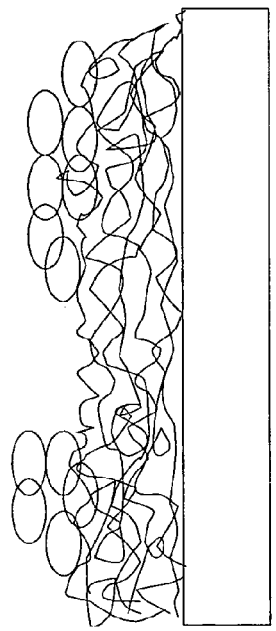
Figure 1C:
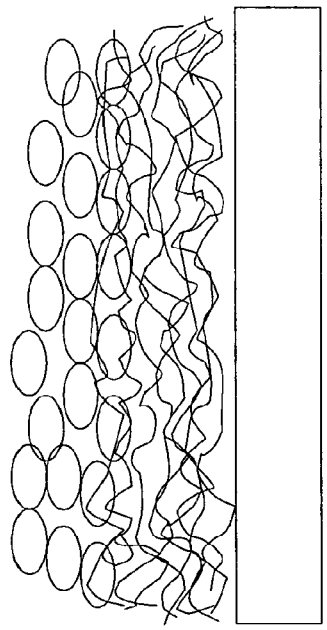
Figure 1D:
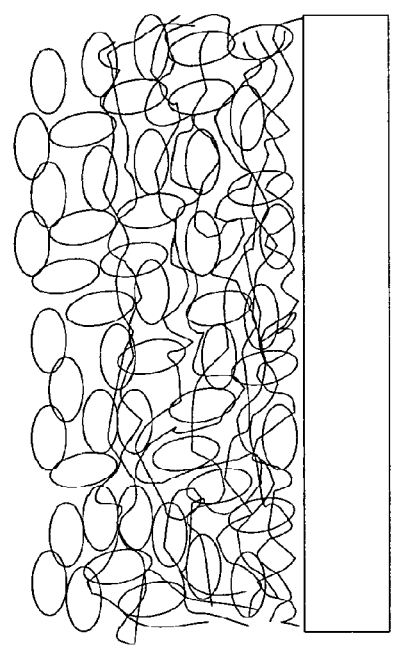

Polypeptide sorption, e.g., protein adsorption and sorption of other electrostatically charged compositions is driven by the net influence of various interdependent interactions between and within surfaces and biopolymer. For example, possible protein-polyelectrolyte interactions can arise from 1) van der Waals forces 2) dipolar or hydrogen bonds 3) electrostatic forces and 4) hydrophobic effects. See Haynes, C. A.; Norde, W. *Colloids and Surfaces B: Biointerfaces* 1994, 2, 517-603. Further, there are several possible modalities for protein sorption into PEMUs. Some of these, previously considered, are shown in FIG. 1. See Ladam, G.; Gergely, C.; Senger, B.; Decher, G.; Voegel, J. C.; Schaaf, P.; Cuisinier, F. J. G. *Biomacromolecules* 2000, 1, 674-687. FIGS. 1A and 1B represent roughly a monolayer adsorbing to the surface either uniformly, A; or island-like, B. FIGS. 1C and 1D are different ways of adsorbing several monolayers, either aggregated on the surface, C; or sorbed throughout the bulk, D.

Given the apparent range and strength of electrostatic forces and the possible modalities of protein sorption, it is generally accepted that the charge plays a major role in adsorption. However, proteins are remarkably tenacious adsorbers, due to the other interaction mechanisms at their disposal. It is an object of this invention to show how surfaces may be selected to encourage or discourage the adsorption of proteins. In the Examples below, different model proteins with different sizes and charges were selected to represent variety from the adsorbate perspective. Similarly, the variety of surface types and potential adsorption mechanisms were represented by different surfaces. Factors such as charge, ionic strength, and thickness of the multilayer were investigated. Our analytical techniques for adsorbed amount included optical labeling, surface sensitive FTIR, and UV-V is spectroscopy, permitting cross-comparisons between data as well as a wide experimental range (from 0.01 to 100 mg m$^{-2}$). We demonstrate that surface properties, rather than the bulk of the multilayer, play the crucial role in the adsorption process, and we show that, by exposing them to films of opposite charge, proteins can be incorporated into PEMUs, where the amount "sorbed" depend on the thickness of the underlying PEMU.

The polyelectrolyte multilayers of the present invention comprise polyelectrolytes having a polyvinyl backbone and functional groups in monomeric repeat units. The PEMUs comprise polyelectrolytes bearing permanently charged functional groups and ionizable functional groups on monomeric repeat units. Preferably, the charge of the ionizable functional groups depends upon conditions in the solutions to which the PEMUs are exposed. In one embodiment, the groups are pH sensitive, that is, the state of protonation can be changed by a change of the pH within a range of about pH 2 to about pH 11 of an aqueous solution to which the PEMU is exposed. For example, they may have a pKa within a range surrounding physiological pH, which is approximately 7.4. In addition, the groups are relatively hydrophilic, such that the functional groups are pH sensitive and interactions between the PEMUs and charged molecules in solution, such as proteins, are predominantly electrostatic charge attraction/repulsion while minimizing other interactions, such as hydrophobic interactions. For example, it is generally preferred that the pH sensitive ionizable groups have a pKa in the range of 3 to 9.

In another embodiment, the ionizable groups are redox-sensitive, that is the oxidation state changes by changing the applied potential over the range of about +1.5 volts to −1.5 volts. More preferably, the redox-sensitive groups undergo reduction/oxidation reactions at applied potentials within +/−1.2 volts using S.H.E. as the reference electrode. Advantageously, PEMUs having these characteristics selectively absorb charged molecules into the thin film and efficiently release charged molecules into the solution based on solution conditions.

A. Polyelectrolytes for Multilayer Films

The oppositely charged polymers (i.e., polyelectrolytes) used to form the films are water and/or organic soluble and comprise one or more monomer repeat units that are positively or negatively charged. The polyelectrolytes used in the present invention may be copolymers that have a combination of charged and/or neutral monomers (e.g., positive and neutral; negative and neutral; positive and negative; or positive, negative and neutral). Regardless of the exact combination of charged and neutral monomers, a polyelectrolyte of the present invention is predominantly positively charged or predominantly negatively charged and hereinafter is referred to as a "positively-charged polyelectrolyte" or a "negatively-charged polyelectrolyte," respectively if the polymer carries a net positive charge at neutral pH or a net negative charge at neutral pH, respectively.

Alternatively, the polyelectrolytes can be described in terms of the average charge per repeat unit in a polymer chain. For example, a copolymer composed of 100 neutral and 300 positively charged repeat units has an average charge of 0.75 (3 out of 4 units, on average, are positively charged at neutral pH). As another example, a polymer that has 100 neutral, 100 negatively charged, and 300 positively charged repeat units would have an average charge of 0.4 (100 negatively charged units cancel 100 positively charged units leaving 200 positively charged units out of a total of 500 units at neutral pH). Thus, a positively-charged polyelectrolyte has an average charge per repeat unit between 0 and 1 and a negatively-charged polyelectrolyte has an average charge per repeat unit between 0 and −1 (at neutral pH). An example of a positively-charged copolymer is PDADMA-co-PAC (i.e., poly(diallyldimethylammonium chloride) and polyacrylamide copolymer) in which the PDADMA units have a charge of 1 and the PAC units are neutral so the average charge per repeat unit is less than 1 (at neutral pH).

Some polyelectrolytes comprise equal numbers of positive and negative repeat units distributed throughout the polymer in a random, alternating or block sequence. These polyelectrolytes are termed "amphiphilic" polyelectrolytes. For examples, a polyelectrolyte molecule may comprise 100 randomly distributed styrene sulfonate repeat units (negative) and 100 diallyldimethylammonium chloride repeat units (positive), said molecule having a net charge of zero.

Some polyelectrolytes comprise a repeat unit that has both a negative and positive charge. Such repeat units are termed "zwitterionic" and the polyelectrolyte is termed a "zwitterionic polyelectrolyte." Though zwitterionic repeat units contribute equal number of positive and negative repeat units, the zwitterionic group is still solvated and relatively hydrophilic. An example of a zwitterionic repeat unit is 3-[2-(acrylamido)-ethyldimethyl ammonia]propane sulfonate, AEDAPS. Preferably, polyelectrolytes comprising zwitterionic groups also comprise pH sensitive units. These pH sensitive units are preferably acrylic acids such as acrylic acids, methacrylic acid, carboxylic acids, and copolymers thereof, and protonatable nitrogens, such as pyridines, imidazoles, piperidines, and primary, secondary or tertiary amine groups, such as allylamine. Zwitterionic groups are present on polyelectrolytes as blocks or randomly dispersed throughout the polymer chain. Preferably, polyelectrolytes comprise between about 1% and about 90% zwitterions units, and more preferably said polyelectrolyte comprises between about 10% and about 70% zwitterionic units. Preferred compositions of polyelectrolytes comprising zwitterionic repeat units also comprise between about 10% and about 90% non-zwitterionic charged repeat units.

The charges on a polyelectrolyte may be derived directly from the monomer units or they may be introduced by chemical reactions on a precursor polymer. For example, PDADMA is made by polymerizing diallyldimethylammonium chloride, a positively charged water soluble vinyl monomer. PDADMA-co-PAC is made by the polymerization of a mixture of diallyldimethylammonium chloride and acrylamide (a neutral monomer which remains neutral in the polymer). Poly(styrenesulfonic acid) is often made by the sulfonation of neutral polystyrene. Poly(styrenesulfonic acid) can also be made by polymerizing the negatively charged styrene sulfonate monomer. The chemical modification of precursor polymers to produce charged polymers may be incomplete and typically result in an average charge per repeat unit that is less than 1. For example, if only about 80% of the styrene repeat units of polystyrene are sulfonated, the resulting poly(styrenesulfonic acid) has an average charge per repeat unit of about −0.8.

Examples of a negatively-charged synthetic polyelectrolyte include polyelectrolytes comprising a sulfonate group ($-SO_3^-$), such as poly(styrenesulfonic acid) (PSS), poly(2-acrylamido-2-methyl-1-propane sulfonic acid) (PAMPS), sulfonated poly (ether ether ketone) (SPEEK), poly(ethylenesulfonic acid), poly(methacryloxyethylsulfonic acid), their salts, and copolymers thereof; polycarboxylates such as poly (acrylic acid) (PAA) and poly(methacrylic acid).

Examples of a positively-charged synthetic polyelectrolyte include polyelectrolytes comprising a quaternary ammonium group, such as poly(diallyldimethylammonium chloride) (PDADMA), poly(vinylbenzyltrimethylammonium) (PVBTA), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group such as poly(N-methylvinylpyridinium) (PMVP), other poly(N-alkylvinylpyridines), and copolymers thereof; and protonated polyamines such as poly(allylaminehydrochloride) (PAH) and polyethyleneimine (PEI).

Some synthetic polyelectrolytes used in accordance with the present invention generally become charged at certain pH values. For example, poly(acrylic acids) and derivatives begin to take on a negative charge within the range of about pH 4 to about 6 and are negatively charged at higher pH levels. Below this transition pH range, however, poly(acrylic acids) are protonated (i.e., uncharged). Similarly, polyamines and derivative thereof take on a positive charge if the pH of the solution is below their $pK_a$. As such, and in accordance with the present invention, the pH of a polyelectrolyte solution may be adjusted by the addition of an acid and/or base in order to attain, maintain, and/or adjust the electrical charge of a polyelectrolyte of a polyelectrolyte at the surface of, or within, a polyelectrolyte multilayer.

The state of ionization, or average charge per repeat unit, for polyelectrolytes bearing pH-sensitive groups depends on the pH of the solution. For example, a polyelectrolyte comprising 100 pH-insensitive positively charged units, such as DADMA, and 30 pH-sensitive negatively charged units, such as AA, will have a net charge of +100 at low pH (where the AA units are neutral) and an average of +100/130 charge per repeat unit; and a net charge of +70 at high pH (where 30 ionized AA units cancel out 30 of the positive charges) and an average of +70/130 charge per repeat unit. The different monomer units may be arranged randomly along the polymer chain ("random" copolymer) or they may exists as blocks ("block" copolymer). The average charge per repeat unit is also known as the "charge density."

Further examples of oppositely-charged polyelectrolytes include charged biomacromolecules, which are naturally occurring polyelectrolytes, or synthetically modified charged derivatives of naturally occurring biomacromolecules. A positively-charged biomacromolecule comprises a protonated sub-unit (e.g., protonated amines). Some negatively charged biomacromolecules comprise a deprotonated sub-unit (e.g., deprotonated carboxylates). Examples of biomacromolecules which may be charged for use in accordance with the present invention include proteins, polypeptides, enzymes, DNA, RNA, heparin, alginic acid, chondroitin sulfate, chitosan, chitosan sulfate, cellulose sulfate, polysaccharides, dextran sulfate, carrageenin, sulfonated lignin, and carboxymethylcellulose.

Natural, or biological, polyelectrolytes typically exhibit greater complexity in their structure than synthetic polyelectrolytes. For example, proteins may comprise any combination of ca. 2 dozen amino acid building blocks. Polymeric nucleic acids such as DNA and RNA may also comprise many different monomer repeat units. The sign and magnitude of the charge on proteins depends on the solution pH, as the charge on proteins is carried by weak acids, such as carboxylates (—COOH), or weak bases, such as primary, secondary, and tertiary amines. Thus, at high pH (basic conditions) amines are deprotonated and uncharged, and carboxylate groups are deprotonated and uncharged. At low pH (acidic conditions) amines are protonated and charged, and carboxylate groups are protonated and uncharged. For proteins, there is a pH at which there are equal numbers of positive and negative charges on the biomolecule, and it is thus electrically neutral. This is termed the isoelectric point, or pI. At pH above the isoelectric point, the protein has a net negative charge and at pH below pI, proteins bear a net positive charge. Proteins that tend to have a preponderance of positive charge at physiological pH, characterized by a high pI, are often termed "basic" proteins, and proteins with a low pI are called "acidic" proteins.

The molecular weight (number average) of synthetic polyelectrolyte molecules is typically about 1,000 to about 5,000,000 grams/mole, preferably about 10,000 to about 1,000,000 grams/mole. The molecular weight of naturally occurring polyelectrolyte molecules (i.e., biomolecules), however, can reach as high as 10,000,000 grams/mole. The polyelectrolyte typically comprises about 0.01% to about 40% by weight of a polyelectrolyte solution, and preferably about 0.1% to about 10% by weight.

Many of the foregoing polymers and polyelectrolytes, such as PDADMA and PEI, exhibit some degree of branching. Branching may occur at random or at regular locations along the backbone of the polymer. Branching may also occur from a central point and in such a case the polymer is referred to as a "star" polymer, if generally linear strands of polymer emanate from the central point. If, however, branching continues to propagate away from the central point, the polymer is referred to as a "dendritic" polymer. Branched polyelectrolytes, including star polymers, comb polymers, graft polymers, and dendritic polymers, are also suitable for purposes of this invention.

Many of the foregoing polyelectrolytes have a very low toxicity. In fact, poly(diallyldimethylammonium chloride), poly(2-acrylamido-2-methyl-1-propane sulfonic acid) and their copolymers are used in the personal care industry, e.g., in shampoos. Also, because the polyelectrolytes used in the method of the present invention are synthetic or synthetically modified natural polymers, their properties (e.g., charge density, viscosity, water solubility and response to pH) may be tailored by adjusting their composition.

By definition, a polyelectrolyte solution comprises a solvent. An appropriate solvent is one in which the selected polyelectrolyte is soluble. Thus, the appropriate solvent is dependent upon whether the polyelectrolyte is considered to be hydrophobic or hydrophilic. A hydrophobic polymer displays less favorable interaction energy with water than a hydrophilic polymer. While a hydrophilic polymer is water soluble, a hydrophobic polymer may only be sparingly soluble in water, or, more likely, insoluble in water. Likewise, a hydrophobic polymer is more likely to be soluble in organic solvents than a hydrophilic polymer. In general, the higher the carbon to charge ratio of the polymer, the more hydrophobic it tends to be. For example, polyvinyl pyridine alkylated with a methyl group (PNM4VP) is considered to be relatively hydrophilic, whereas polyvinyl pyridine alkylated with an octyl group (PNO4VP) is considered to be more hydrophobic. Thus, water is preferably used as the solvent for hydrophilic polyelectrolytes and organic solvents such as ethanol, methanol, dimethylformamide, acetonitrile, carbon tetrachloride, and methylene chloride are preferably used for more hydrophobic polyelectrolytes.

Examples of polyelectrolytes that are soluble in water include poly(styrenesulfonic acid), poly(2-acrylamido-2-methyl-1-propane sulfonic acid), sulfonated lignin, poly(ethylenesulfonic acid), poly(methacryloxyethylsulfonic acid), poly(acrylic acids), poly(methacrylic acids) their salts, and copolymers thereof; as well as poly(diallyldimethylammonium chloride), poly(vinylbenzyltrimethylammonium), ionenes, poly(acryloxyethyltrimethyl ammonium chloride), poly(methacryloxy(2-hydroxy)propyltrimethyl ammonium chloride), and copolymers thereof; and polyelectrolytes comprising a pyridinium group, such as, poly(N-methylvinylpyridium), protonated polyamines, such as, poly(allylamine hydrochloride) and poly(ethyleneimine).

Examples of polyelectrolytes that are soluble in non-aqueous solvents, such as ethanol, methanol, dimethylformamide, acetonitrile, carbon tetrachloride, and methylene chloride include poly(N-alkylvinylpyridines) and poly(N-alkylvinylimidazoles), and copolymers thereof in which the alkyl group is longer than about 4 carbon atoms. Preferable alkylating groups are butyl, pentyl, hexyl, heptyl, and octyl groups which may be present on the polyvinylpyridines and polyvinylimidazoles as straight or branched carbon chains. Other examples of polyelectrolytes soluble in organic solvents include poly(styrenesulfonic acid), poly(diallyldimethylammonium chloride), poly(N-methylvinylpyridinium) and poly(ethyleneimine) where the small polymer counterion, such as chloride or bromide, has been replaced by a large hydrophobic counterion such as tetrabutyl ammonium, tetraethyl ammonium, iodine, hexafluorophosphate, tetrafluoroborate, or trifluoromethane sulfonate.

In one embodiment the negatively-charged polyelectrolyte is selected from the group consisting of poly(styrenesulfonic acid), poly(2-acrylamido-2-methyl-1-propane sulfonic acid), sulfonated lignin, poly(ethylenesulfonic acid), poly(methacryloxyethylsulfonic acid), sulfonated poly(ether ether ketone), poly(acrylic acid), poly(methacrylic acid), derivatives thereof, and combinations thereof.

In another embodiment, the positively-charged polyelectrolyte is selected from the group consisting of poly(diallyldimethylammonium chloride), poly(vinylbenzyltrimethylammonium chloride), ionenes, poly(acryloxyethyltrimethyl ammonium chloride), poly(methacryloxy(2-hydroxy)propyltrimethyl ammonium chloride), poly(N-methylvinylpyridinium), other poly(N-alkylvinylpyridiniums), a poly(N-arylvinylpyridinium), poly(allylaminehydrochloride), poly(vinylimidazole), poly(N-methylvinylimidazolium), poly(N-alkylvinylimidazoliums) having higher alkyl groups, derivatives thereof, and combinations thereof. Preferred polyelectrolyte repeat units, both positively charged and negatively charged are shown in Table I.

TABLE I

Polyelectrolyte repeat units for use in building PEMUs

| Name | Structure |
|---|---|
| diallyldimethylammonium (PDADMA) | |
| styrenesulfonic acid (PSS) | |
| N-methyl-2-vinyl pyridinium (PM2VP) | |

TABLE I-continued

Polyelectrolyte repeat units for use in building PEMUs

| Name | Structure |
|---|---|
| N-methyl-4-vinylpyridinium (PM4VP) | |
| N-octyl-4-vinylpyridinium (PNO4VP) | |
| N-methyl-2-vinyl pyridinium-co-ethyleneoxide (PM2VP-co-PEO) | X and Y denote proportions of repeat units |
| acrylic acid (PAA) | |
| allylamine (PAH) | |
| ethyleneimine (PEI) | |

In another embodiment, the charged polyelectrolyte is a synthetic copolymer comprising two or more charged repeat units, at least one of the repeat units being pH sensitive and the other repeat unit being pH insensitive, that is, maintaining the same charge over the working pH range of use. The rationale behind such a mixture of pH-sensitive groups and pH-insensitive groups on the same molecule is that the pH insensitive groups interact with other, oppositely-charged pH insensitive groups on other polymers, holding the multilayer together despite the state of ionization of the pH-sensitive groups. Preferably, the pH insensitive groups are also hydrophobic. Without being bound to a particular theory, it is thought that if the permanently charged groups are also hydrophobic, the groups exclude water. Solvation weakens charge interactions, so if water is excluded from the charged monomeric units, the intermolecular charge interactions between polycations and polyanions are enhanced.

Preferably, the pH-insensitive groups constitute about 10 mol % to about 90 mol % of the repeat units of the polyelectrolyte, more preferably from about 20 mol % to about 80 mol %. Preferably, the pH-sensitive groups constitute about 30 mol % to about 70 mol % of the repeat units of the polyelectrolyte. The ratio of pH-sensitive to pH-insensitive charged repeat units comprising a polyelectrolyte molecule, or a blend of polyelectrolyte molecules, is important. Too few pH-insensitive charged repeat units may be insufficient to hold the polyelectrolyte complex together when the pH is changed. Too many charged pH-insensitive units will not allow the charge of the complex to change sufficiently to trap and release proteins. The preferred ratio of pH sensitive functional group to pH insensitive charged functional group enables control of surface and/or bulk charge without leading to disruption of the thin polyelectrolyte complex film. Thus ratios of pH sensitive functional group to pH insensitive charged functional group are preferably in the range 1:10 to 10:1, and more preferably in the range 2:10 to 10:2. Similarly, the total percentage of pH sensitive functional group is preferably between 5% and 95%.

Preferably, the pH sensitive repeat units have a pKa from about 3 to about 9, more preferably from about 5 to about 8, with pKa from about 6 to about 7 being most preferred. The pKa of the functional group is preferably within this range because charge switching by protonation/deprotonation occurs under mildly acidic or alkaline conditions, and the buffer pH is maintained near physiological pH, which is about 7.4. Advantageously, the mild conditions of acidity/alkalinity keeps charged molecules such as protein in their native conformations. Since denaturing is avoided, the protein remains bioactive, thus allowing observation of protein reactions within the thin films. Moreover, charge switching occurs within a relatively narrow range of pH, allowing the thin films to absorb and release proteins having a wide range of pI. "pI" refers to the proteins isoelectric point, i.e., the pH at which the protein is overall charge neutral. At pH below pI, the protein becomes positively charged. At pH above pI, the protein becomes negatively charged.

Preferably, the pH sensitive groups are hydrophilic. Without being bound to a particular theory, it is thought that hydrophilicity weakens hydrophobic interactions between pH sensitive groups and charged adsorbates, such that interactions are predominantly electrostatic charge interactions between oppositely charged polyelectrolytes and charged adsorbates. Hydrophilicity may by measured by water solubility, i.e., a relatively hydrophilic functional group preferably is about 1 wt. % or more soluble in water after 48 hours of stirring, or preferably has a partition coefficient between octanol and water such that log of the partition coefficient, "log P", is less than about 0.

In one embodiment of the present invention, the pH sensitive ionizable group is an imidazole repeat unit having the structure:

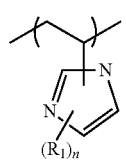

wherein each $R_1$ is independently hydrogen, or optionally substituted alkyl, aryl, alkaryl, heterocyclo, alkoxy, aryloxy, alkaryloxy, alkyl ester, aryl ester, alkaryl ester, alkyl amide, aryl amide or alkarylamide, and n is 0 to 2. Exemplary heterocycles include piperidinyl, pyrazinyl, purinyl, oxazolyl, isoxazolyl, thienyl, furyl, pyridinyl and the like. Representative substituents include alkyl, aryl, heterocyclo, hydroxyl, alkoxy, amino and the like. Preferably neither nitrogen-ring atom is quaternary and the imidazole ring is linked to the polyvinyl backbone via a ring carbon. In addition, each $R_1$ is hydrogen or lower alkyl, more preferably each $R_1$ is hydrogen. If $R_1$ is other than hydrogen, it is preferably unsubstituted lower alkyl.

An exemplary polycation satisfying these conditions is quaternized polyvinylimidazole (QPVI) which comprises about 60 mol % alkylvinylimidazolium repeat units and unquaternized polyvinylimidazole repeat units. The quaternized groups provide permanent charge and may be alkylated with higher carbon alkyl groups to impart hydrophobicity upon the permanently charged groups. The unquaternized imidazole groups provide pH sensitivity to the polycation. The pKa of the imidazole group is about 5.23, which allows charge switching under mild, slightly acidic, buffer conditions. Advantageously, the unquaternized imidazole group is relatively hydrophilic, as shown by a log partition coefficient which is about −0.8. Exemplary polyvinylimidazoles and polyvinylimidazoliums are shown in Table II. Table II also lists the pKas of each pH sensitive imidazole group.

TABLE II

Vinylimidazoles repeat units

| Name | Structure[1] | pKa |
|---|---|---|
| N-vinylimidazole | | 6.07 |
| 1-methyl,4-vinylimidazole | | 5.45 |
| 4(5)-vinylimidazole (PVI) | | 6.19 |
| 1-methyl-5-vinylimidazole | | 5.28 |
| 1-butyl-5-vinylimidazole | | 7.02 |

TABLE II-continued

Vinylimidazoles repeat units

| Name | Structure[1] | pKa |
|---|---|---|
| 1-butyl-5-vinylimidazole-co-4(5)-vinylimidazole | | 5.01 |
| 1-butyl,4-vinylimidazole-co-4(5)-vinylimidazole | | 5.12 |

[1] X and Y denote proportions of repeat units.

Optionally, the polyelectrolyte comprising imidazole repeat units also comprises an uncharged or net charge neutral repeat unit that is not pH sensitive in the operating pH range, for example, about pH 3 to about pH 9. Said uncharged repeat unit is preferably hydrophilic. Preferred uncharged hydrophilic repeat units are acrylamide, vinyl pyrrolidone, and vinyl caprolactam. The structures of these uncharged repeat units are shown in Table III. Preferred net charge neutral repeat units are zwitterionic repeat units such as poly(3-[2-(acrylamido)-ethyldimethyl ammonia]propane sulfonate) (PAEDAPS) and poly(N-propane sulfonate-2-vinyl pyridine) (P2PSVP). The structures of these zwitterions are shown in Table IV. The preferred amount of neutral repeat unit on a polyelectrolyte chain is between about 1 mole % and about 50 mol %, preferably between about 10 mole % and about 30 mol %.

TABLE III

Neutral Repeat Units for use in PEMUs

| Name | Structure |
|---|---|
| acrylamide | |
| vinylpyrrolidone | |
| vinylcaprolactam | |

TABLE IV

Zwitterionic Repeat Units for use in PEMUs

| Name | Structure |
|---|---|
| 3-[2-(acrylamido)-ethyldimethyl ammonio] propane sulfonate (AEDAPS) | |
| N-propane sulfonate-2-vinyl pyridine (2PSVP) | |

Optionally, the polyelectrolyte repeat units are co-polymerized with poly(ethylene oxide) (PEO), or poly(ethylene glycol) (PEG). These repeat units are neutral and hydrophilic.

Optionally, multilayers may have a composition gradient, and therefore a hydrophilicity gradient. A composition gradient would be desirable where PEMU durability is an issue, since hydrophobic polyelectrolytes form less swollen and more resilient films. Such a film employing a hydrophobic core and a hydrophilic surface would preserve durability, but maintain the ability to absorb proteins due to the solvated and swollen surface, with the hydrophilic polyelectrolyte limited to the outer, or outer few, layers. Also, using a specialized polymer as the outer layer only would help conserve a potentially costly material. A preferred gradient may comprise hydrophobic layers near the substrate such that the repeat units are solvated with about 4 water molecules/repeat unit, and the hydrophilic layers at or near the surface of the film are solvated with about 20 water molecules/repeat unit. More preferably, the gradient is such that hydrophobic layers are solvated with about 6 water molecules/repeat unit, and the hydrophilic layers are solvated with about 12 water molecules/repeat unit. An exemplary thin film having a gradient may comprise layers of polyvinyl pyridines quaternized with higher alkyl groups as the polycation and polystyrene sulfonate as the polyanion near the substrate, and layers of polyvinyl imidazole quaternized with lower alkyl groups as the polycation and polyacrylic acids as the polyanion near the surface.

Because pH-sensitive groups are co-polymerized with pH-insensitive groups so that the PEMU stays together by intermolecular charge interactions between polycations and polyanions, the pH-sensitive groups are in a sense "diluted" by the pH-insensitive groups. The drawback with diluting ionizable groups is that, potentially, with fewer pH switchable internal charges, less biomaterial may be held and released from the PEMU. This effect is particularly noticeable with the uptake and release of smaller molecules, such as vitamins, neurotransmitters, adenosine triphosphate (ATP), adenosine diphosphate (ADP), and other biologically active small molecules that bear a charge. In order to enhance stability of a PEMU to internal, including surface, ionization it is advantageous to induce chemical crosslinks within the structure. Such crosslinking is achieved either by thermal or radiation treatment ("curing") of the multilayer after preparation, or by exposing the multilayer to chemical crosslinking agents. For example, a small fraction of unquaternized nitrogens within QPVI or PM2VP or polymeric primary, secondary or tertiary amines, residing within a preformed multilayer, may be exposed to a difunctional crosslinking agent, such as $XCH_2$-$\phi$-$CH_2X$, where X is a halogen (Cl, Br or I) and $\phi$ is a phenyl group. The phenyl group may be replaced by another aromatic or aliphatic moiety, and easily-diplaceable groups, such as toluene sulfonate, may replace the halogen.

Alternatively, crosslinking may be accomplished by reaction of functional groups already present with a multilayer. For example, Harris etla., J. Am. Chem. Soc. 121, 1978 (1999) describe the thermal treatment of a multilayer comprising amine and carboxylic acid groups to form internal amide bonds. Yet another preferred method of introducing crosslinking, disclosed by Kozlovskaya et al. (Macromolecules, 36, 8590 (2003)) is by the addition of a carbodiimide, which activates chemical crosslinking.

It is desired that the crosslinking not be excessive, as the crosslinking itself may use some of the ionizable functionality within the multilayer and the internal ionization capacity may decrease. Further, the transport of species within the multilayer generally slows down as the crosslinking percent increases, leading to slower uptake and release. Therefore, a crosslinking level of 0.1-90% (1-90 percent of repeat units within the multilayer are involved in a crosslink) is preferred, a crosslinking level of 0.1-50% is more preferred, and a crosslinking level of 1-10% is still more preferred.

In another embodiment, the charged polyelectrolyte is a synthetic copolymer comprising two or more charged repeat units, at least one of the repeat units being redox active and the other repeat unit being electrochemically inert, that is, does not undergo electrochemical reduction/oxidation under an applied potential. Laurent and Schlenoff describe a multilayer comprising a redox active unit. See Laurent and Schlenoff, *Langmuir*, 1997, 13, 1552-1557. A redox active unit is capable of undergoing electron transfer reactions. These electrons may be tranferred directly to or from other chemical reagents, or the electrons may be provided/removed by an electrode (electrochemistry). The electrochemical oxidation or reduction of a species is preferred to chemical oxidation/reduction for the following reasons: (1) the chemical composition, including the pH, of the solution is changed less; (2) electrochemical reactions may be started or stopped instantaneously (with an electrical switch); (3) the polarity of electrochemical reactions, whether in the oxidizing (anodic) or reducing (cathodic) direction may be controlled more easily (by the polarity of the applied potential); (4) the rate of electrochemical reactions may be controlled by controlling the current; (5) the extent of internal (plus surface) charge switching is controlled by the applied potential; (6) the extent of internal (plus surface) charge switching is known from the amount of redox-active material in the stationary phase and the charge passed (Coulombs) from Faraday's Law; (7) the degree and polarity of the state of internal and charge of a multilayer comprising a redox active unit is determined by the state of the redox active unit.

A range of redox repeat units may be used, as previously noted. Such units include quaternized pyridine, coordinated metal (e.g., ferrocene), pyrrole, aniline and thiophene repeat units. In a preferred embodiment, the quaternized bipyridine repeat unit has the structure:

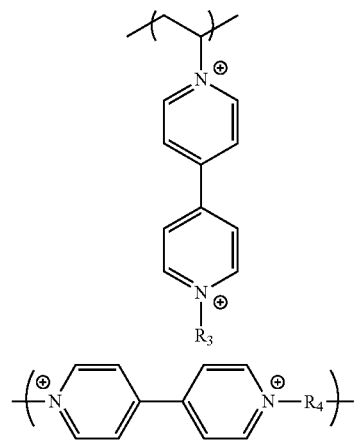

wherein $R_3$ and $R_4$ are optionally substituted alkyl, aryl, alkaryl, alkoxy or heterocyclo. Preferably, $R_3$ and $R_4$ are alkyl or aryl, and still more preferably $R_3$ is methyl. In a preferred embodiment, the coordinated metal repeat unit has the structure:

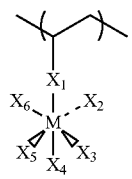

wherein M is osmium, ruthenium, cobalt or iron, and $X_1$ to $X_6$ are independently pyridine, bipyridine, terpyridine, nitrile, aceyl acetonate, trisbipyridyl, pyridine carboxylate, pyrazine carboxylate or imidazole; for example, the coordinated metal repeat unit may be a ferrocene repeat unit:

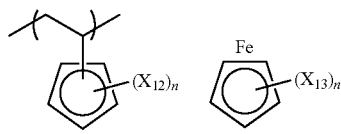

wherein $X_{12}$ and $X_{13}$ are independently hydrogen or optionally substituted alkyl, aryl, alkaryl, alkoxy, alkylester, alkylamide or heterocyclo, and each n is independently 0 to 2. In a preferred embodiment, the pyrrole repeat unit has the structure:

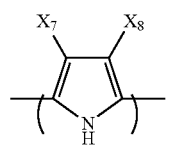

wherein $X_7$ and $X_8$ are independently hydrogen, or optionally substituted alkyl or alkoxy. In a preferred embodiment, the aniline repeat unit has the structure:

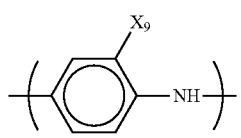

wherein $X_9$ is hydrogen, $SO_3^-$ or optionally substituted alkyl or alkoxy. In a preferred embodiment, the thiophene repeat unit has the structure:

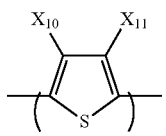

wherein $X_{10}$ and $X_{11}$ are independently hydrogen, or optionally substituted alkyl, alkoxy, or dialkoxy wherein $X_{10}$ and $X_{11}$, along with the carbon ring atoms to which they are bonded form a fused ring.

In one embodiment, a multilayer is built from a positive polyelectrolyte comprising the quaternized bipyridine (or "viologen") unit, such as poly(butanyl viologen) and a negative polyelectrolyte, such as PSS. Under the conditions of multilayer construction, the viologen units are in their oxidized form (each viologen unit bearing two positive charges). The positive charges pair up with the negative charges on the PSS during multilayer construction from aqueous solution comprising polyelectrolytes (e.g. 0.01 M concentration of repeat units) and salt (e.g. 0.1 M). The multilayer is contructed on an electrically conductive surface. After construction is complete, the viologen units are reduced, each by one electron, causing an excess of negative charge within the multilayer and an influx of cationic species to balance this. These cationic species may be small molecules, or they may be larger biomolecules, such as basic proteins. The cationic species are subsequently released by the application of an oxidizing potential, which restores the charge on the viologen units to the original state and removes the excess negative charge within the multilayer, releasing the trapped positively-charged species.

Alternatively, the polyelectrolyte comprising the redox species, such as viologen, may be assembled into the multilayer in the reduced form (by addding a chemical reducing agent to the polyelectrolyte buildup solutions). In this case, oxidation creates additional positive charges within the multilayer. For the trapping and removal of positively charged species, it is advantageous to construct a multilayer terminated with a negative charge, for the reasons presented above. It is then advantageous to oxidize the material creating a repulsive charge.

Alternatively, polyelectrolytes comprising a mixture of redox active units may be employed for multilayer construction.

A preferred redox active unit is one that undergoes reversible electron transfer within a potential window where disadvantageous competing electron transfer reactions, such as the electrochemical reduction or oxidation of water, do not occur. Generally these redox active units will have a standard reduction potential of between +1.2 and −1.2 volts vs the standard hydrogen electrode (SHE). Preferably, the redox active units will have a standard reduction potential of between +0.8 and −0.8 volts vs. SHE. The preferred redox unit will be stable in aqueous solutions in both oxidized and reduced states.

A preferred redox active unit is the quaternized bipyridine unit, included either as the main chain within one or more of the polyelectrolytes comprising the multilayer, or as a pendant group on one or more of the polyelectrolytes comprising the multilayer. Further preferred redox active units, also as part of one of the polyelectrolytes comprising the multilayer, are the ferrocene group or derivatives thereof. Preferably, if the redox active group is a derivative of ferrocene, the derivative has a less positive standard reduction potential than ferrocene itself. Other preferred redox active units comprise the thiol or disulfide unit. Other preferred redox active units are polypyrroles, polythiophenes, and polyaniline.

To prevent the breakup of the redox active multilayer during internal ionization changes, it is advantageous to employ copolymers having a random or block-like distribution of non-redox active repeat units and redox active repeat units. Stabilizing ionic interactions between non-redox active repeat units will not be affected by redox changes on neighboring redox active units. An example of such as polymer is a poly(vinylpyridine) or poly(vinylimdazole) copolymer with randomly distributed viologen pendant groups and non-redox active quaternized sites. A small amount of crosslinking is an alternative for preventing decomposition or degradation of the multilayer during redox cycling.

Compositions employing redox-sensitive repeat units are preferably disposed on the surface of and in contact with an electronically conducting substrate, which transfers electrons to, or from, the redox-sensitive repeat units. Preferably, the conductive substrates are themselves inert or unreactive in the potential range of interest (about −1.2 V to about +1.2V versus standard hydrogen electrode). In order to maximize the surface-to-volume ratio of the medium comprising redox-sensitive repeat units, the electronically conductive substrate is preferably porous, preferably comprising electronically conductive particulate material, such as beads or fibers, or a monolithic article having a plurality of interconnected pores, such as a metal sponge, or reticulated carbon.

The electrochemical potential of conducting substrates coated with media comprising redox-sensitive repeat units is preferably controlled by two or three terminals of a device for controlling potential, such as a variable-voltage power supply or a potentiostat. Preferably, electrical contact is made to the conducting substrate by a wire, the article is immersed in electrolyte, and a counter electrode is placed in contact with said electrolyte. The potential is then adjusted between the article and the counter electrode to achieve the desired electrochemical potential. More preferably a reference electrode, also in contact with the electrolyte, is employed. In this three-electrode system, the potential is measured versus the reference electrode and current passes between the article and the counter electrode. The three-electrode arrangement produces more stable and reproducible electrochemical potentials. The preferred device for controlling the potential in a 3-electrode system is the potentiostat.

In another embodiment of this invention, areas or regions in an array of media disposed on a surface are addressed individually and/or independently by providing individual electrical contacts for each area or region. Individual contacts preferably comprise inert metal pads, preferably gold, deposited, preferably by evaporation or sputtering, on nonconducting substrates. Each contact behaves as an individual electrode and may optionally have separate electron conducting paths leading back to the potential control apparatus (the potentiostat).

B. Additives for Use in Building PEMUs

The PEMUs of the present invention may be built by incorporating additives in the polyelectrolyte solutions which affect the thin film mechanical properties, solvation, and ability to absorb/release charged molecules. Optionally, the polyelectrolyte solutions may comprise one or more "salts." A "salt" is defined as a soluble, ionic, inorganic compound that dissociates to stable ions (e.g., sodium chloride). A salt is included in the polyelectrolyte solutions to control the thickness of the adsorbed layers. More specifically, including a salt increases the thickness of the adsorbed polyelectrolyte layer. In general, increasing the salt concentration increases the thickness of the layer for a given spray coverage and contact time. This phenomenon is limited, however, by the fact that upon reaching a sufficient salt concentration, multilayers tend to dissociate. Typically, the amount of salt added to the polyelectrolyte solution is about 10% by weight or less.

Both dip coating and spraying permit a wide variety of additives to be incorporated into a film as it is formed. Additives that may be incorporated into polyelectrolyte multilayers include inorganic materials such as metallic oxide particles (e.g., silicon dioxide, aluminum oxide, titanium dioxide, iron oxide, zirconium oxide and vanadium oxide) and clay minerals (e.g., hectorite, kaolin, laponite, montmorillonite and attapulgite). For example, nanoparticles of zirconium oxide added to a polyelectrolyte solution or complex solution tend to improve the abrasion resistance of the deposited film. See Rosidian et al., *Ionic Self-assembly of Ultra Hard $ZrO_2$/polymernanocomposite Films*, Adv. Mater. 10, 1087-1091. Other additives include carbon fibers and carbon nanotubes (having a diameter less than 100 nanometer and an aspect ratio (length to width) of at least 10:1); carbon nanotubes may be of particular advantage in multilayer films containing redox sensitive repeat units.

C. Deposition Methods and Substrates for Building PEMUs

Polyelectrolyte Multilayers may be built by a variety of deposition techniques. For example, PEMUs may be built by alternately dipping the substrate into solutions comprising polyelectrolytes. The alternating polyelectrolyte layering method, however, does not generally result in a layered morphology of the polymers with the film. Rather, the polymeric components interdiffuse and mix on a molecular level upon incorporation into the thin film. See Lösche et al., *Macromolecules* 31, 8893 (1998). Thus, the polymeric components form a true molecular blend, referred to as a "polyelectrolyte complex," with intimate contact between polymers driven by the multiple electrostatic complexation between positive and negative polymer segments. The complexed polyelectrolyte within the film has similar morphology as a polyelectrolyte complex formed by mixing solutions of positive and negative polyelectrolyte. It is also known that although there is extensive intermingling of neighboring layers over a range of 4-6 nominal layers, is it possible to obtain actual layers of different composition, or strata, by interspersing several layers made from one pair of polyelectrolytes by several layers made from a different pair. See Lösche et al., *Macromolecules* 31, 8893 (1998). For example, if polymers A and C are positively charged and polymers B and D are negatively charged, about 3 or 4 pairs of A/B layers followed by about 3 or 4 pairs of A/D or C/D layers will produce two strata of distinct composition.

Alternatively, the thin film coating may be applied to a surface using a pre-formed polyelectrolyte complex. See Michaels, *Polyelectrolyte Complexes*, Ind. Eng. Chem. 57, 32-40 (1965). This is accomplished by mixing the oppositely-charged polyelectrolytes to form a polyelectrolyte complex precipitate which is then dissolved or re-suspended in a suitable solvent/liquid to form a polyelectrolyte complex solution/dispersion. The polyelectrolyte complex solution/dispersion is then applied to the substrate surface and the solvent/liquid is evaporated, leaving behind a film comprising the polyelectrolyte complex. To aid in dissolution or dispersion of the complex, both a salt, such as sodium bromide, and an organic solvent, such as acetone is added to the solution comprising the precipitated complex.

The polyelectrolyte solutions and/or polyelectrolyte complex may be deposited on a substrate by any appropriate method such as casting, dip coating, doctor blading, and/or spraying. Particularly preferred methods are dip coating and spraying. Spraying is especially preferred when applying the coating to large areas using alternating exposure of oppositely-charged polyelectrolyte solutions. Spraying alternating oppositely-charged polyelectrolyte solutions has several advantages over the Michaels coating and evaporation method, including: improved control over film thickness especially the ability to make extremely thin thicknesses (e.g., less than about 1 μm), enhanced uniformity of film thickness especially over uneven surfaces and contours, and films may be produced without the use of organic solvents which may require precautions to avoid negative health and/or environmental consequences. The solutions may be sprayed onto a substrate by any applicable means (e.g., an atomizer, an aspirator, ultrasonic vapor generator, or entrainment in compressed gas). In fact, a hand operated "plant mister" has been used to spray the polyelectrolyte solutions. Typically, the droplet size in the spray is about 10 nm to about 1 mm in diameter. Preferably, the droplet size is about 10 μm to 100 μm in diameter. The coverage of the spray is typically about 0.001 to 1 mL/cm$^2$, and preferably about 0.01 to 0.1 mL/cm$^2$.

The duration in which the polyelectrolyte solution is typically in contact with the surface it is sprayed upon (i.e., the contact time) varies from a couple of seconds to several minutes to achieve a maximum, or steady-state, thickness. The contact duration is selected based on the desired relationship between throughput (i.e., the rate at which alternating layers are created) and layer thickness. Specifically, decreasing the contact duration increases throughput and decreases layer thickness whereas increasing the duration decreases throughput and increases thickness. Preferably, the contact time is selected to maximize the throughput of layers that have a satisfactory thickness and are uniform across the surface.

Rinsing, to remove nonadsorbed polyelectrolyte, between the application of each polyelectrolyte solution is preferred. The rinsing liquid comprises an appropriate solvent (e.g., water or organic solvent such as alcohol). Preferably the solvent is water. If the solvent is inorganic (e.g., water), the rinsing liquid may also comprise an organic modifier (e.g., ethanol, methanol or propanol). The concentration of organic modifier can be as high as less than 100 percent by weight of the rinsing liquid, but is preferably less than about 50 percent by weight. The rinsing liquid may also comprise a salt (e.g., sodium chloride) which is soluble in the solvent and the organic modifier, if included in the rinsing liquid. The concentration of salt is preferably below about 10 percent by weight of the rinsing liquid. It should be noted that as the concentration of organic modifier increases the maximum solubility concentration of salt decreases. The rinsing liquid, however, should not comprise a polyelectrolyte. The rinsing step may be accomplished by any appropriate means (e.g., dipping or spraying). Preferably, the rinsing step is accomplished by spraying. Although rinsing removes much of the polymer in the layer of liquid wetting the surface, the amount of waste is preferably reduced by recycling the polymer solutions removed from the surface. Optionally, prior to depositing the second through n[th] layer of sprayed oppositely charged polyelectrolyte solution, the surface of the multilayer structure may be dried.

Particles with diameters ranging from nanometers to millimeters may also be coated with polyelectrolyte complex. If the alternate layering method is used, it is not practical to coat particles individually. Neither is the spray method practical, unless particles are larger than about 100 μm. Instead, batches of particles are alternately immersed in coating solutions, with intervening rinse, as detailed by Caruso and Sukhorukov, Chapter 12 in "*Multilayer Thin Films*", G. Decher and J. B. Schlenoff, Eds., Wiley-VCH, Weinheim, 2003.

If a column comprising particles coated with multilayer is to be employed, it is possible to first pack the column with particles, and then alternately flow through solutions of polyelectrolyte and rinse. This approach is advantageous because it avoids damaging the gel-like polyelectrolyte complex films during batch manipulation and coating. Further, such an in-situ coating procedure helps to cement the individual particles together and makes the column more resilient.

In one embodiment of the present invention the polyelectrolyte complex is a coating or layer on a substrate or substratum and may be deposited according to any appropriate method (see, e.g., supra, as a multilayer or as a pre-formed polyelectrolyte complex). The substratum may be non-porous or porous and may be comprised of many types of materials that are well know in the art such as polymers, metals, and ceramics. The surface of polymeric support materials may be positively charged by comprising tetraalkyl ammonium groups, negatively charged by comprising sulfonate groups, or neutral. In another embodiment the substratum is porous and comprises a material selected from the group consisting of polypropylene, nylon, polytetrafluoroethylene, glass, and alumina (all of which are known to those of skill in the art). Typically, the average size of the pores is between about 100 nm and about 10 μm and the degree of porosity is between about 0.1 and about 60%. In yet another embodiment the polyelectrolyte complex is deposited on or adsorbed to at least a portion of the surface of the stationary phase of a chromatographic medium such as particulate chromatographic column packing material, the interior of capillary tubes as used for capillary electrophoresis chromatography (see, U.S. Pat. No. 6,402,918 and U.S. Pat. No. 6,841,054 which are hereby incorporated by reference in their entireties for all purposes), or a porous continuous solid often referred to as a monolithic stationary phase (see Zou et al., *Monolithic stationary phased for liquid chromatography and capillary electrochromatography*, Journal of Chromatography A, 954, 5-32 (2002)).

In embodiments where the PEMU comprises a redox active unit, the substrates are electrically conductive. A preferred electrically conductive substrate on which multilayers are prepared is metal-coated glass beads of diameter 10-1000 micrometers.

Other possible conductive substrates include metal beads (e.g. steel, nickel, or lead, which are inexpensive), noble metals (e.g., gold, platinum, more expensive), semiconductors (e.g., indium-doped tin oxide), carbon fibers and nanotubes, beads (insulating or conductive) coated with electrically conducting polymer, expanded metal foam, porous metal, or a vitreous carbon sponge.

For clarity, we employ the following shorthand for multilayers built on substrates: $(A/B)_x$ where A is the starting polyelectrolyte contacting the substrate, B is the terminating polyelectrolyte in contact with subsequent protein solutions and x is the number of layer pairs. In $(A/B)_xA$, A would be the terminating polymer. Salt, MY (cation M and anion Y), has an important role in the buildup process and is represented by $(A/B)_x@c$ MY, where c is the molarity of the salt (MY) in the polymer solution. The pH can be included in the nomenclature esp. when using pH dependent PEMUs. For example, $(PAH/PAA)_2PAH$ @0.25 M NaCl @pH 7.4, represent two layers pairs of PAH/PAA built at 0.25 M NaCl and a pH of 7.4.

The following examples will further illustrate the present invention. The above described polyelectrolytes and additives were used for building PEMUs of a variety of compositions on substrates. The PEMUs, solutions, and additives were modified in various ways as shown in the examples, and the effects of those modifications on the ability of the PEMU to efficiently absorb and release charged molecules, especially proteins, was monitored using the above described quantitative and qualitative methods.

The PEMU/protein combinations were selected to represent various modes of surface/biomolecule interaction and adsorption. While the number of possible combinations is immense, the goal was to make some broad deductions concerning the role of each interaction type. Clearly, from electrostatic arguments, protein adsorption should be minimized on surfaces with like charge. This is not always the case, so in some PEMUs modifications were employed to minimize non-electrostatic charge thin film/protein interactions.

DEFINITIONS

Unless otherwise indicated, the alkyl groups described herein are preferably lower alkyl containing from one to eight carbon atoms in the principal chain and up to 20 carbon atoms. They may be straight or branched chain or cyclic and include methyl, ethyl, propyl, isopropyl, butyl, hexyl and the like. If substituted, they are alkyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters and ethers.

The terms "aryl" or "ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. Exemplary substituents include alkyl and other hydrocarbyl substituents or at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters and ethers.

The term "alkaryl" as used herein alone or as part of another group denotes optionally substituted moieties comprising an alkyl moiety covalently linked to an aryl moiety. If substituted, the alkyl or aryl component of the alkaryl moiety may be substituted by any of the aforementioned alkyl or aryl substituents.

The terms "heterocyclo" or "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, ketals, acetals, esters and ethers.

The term "heteroaromatic" as used herein alone or as part of another group denote optionally substituted aromatic groups having at least one heteroatom in at least one ring, and preferably 5 or 6 atoms in each ring. The heteroaromatic group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heteroaromatics include furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, ketals, acetals, esters and ethers.

Unless otherwise indicated, substituted alkoxy and other moieties described herein may include any of the aforementioned alkyl or aryl substituents.

EXAMPLE 1

Polyelectrolytes for Building PEMUs

Refer back to Table I for the structures of polyelectrolytes for use in building PEMUS. Poly(styrenesulfonic acid), PSS (molecular weight, MW ~$7 \times 10^4$), poly(diallyldimethylammonium chloride), PDADMAC (MW ~$3 \times 10^5$), poly(allylamine hydrochloride), PAH (MW ~$7 \times 10^4$) and poly (acrylic acid), PAA (MW ~$24 \times 10^4$) was used as received from Aldrich. Poly(N-methyl-2-vinyl pyridinium bromide), PM2VP (MW ~$5 \times 10^4$, about 90% quaternized) was used as received from Polysciences Inc. Poly(N-methyl-2-vinyl pyridinium iodide-block-ethylene oxide), PM2VP-b-PEO (PM2VP block 86% quaternized, respective block molecular weights 56, 500:5900 $M_w/M_n$=1.08) was used as received from Polymer Source Inc. Random copolymer PDADMA-co-poly (acrylic acid), PAA (mol % of acrylic acid repeat unit, AA, is 36%; Mw ~$2 \times 10^5$) was used as received from Calgon Merquat® 281.

When the random copolymer PDADMA-co-PAA was used in making multilayer, in order to keep the stability of the PEMUs, 80 mol % of homopolymer PDADMA was blended with 20 mol % PDADMA-co-PAA to work as the polycation. This polycation mixture is hereinafter referred to as the "copolymer blend."

All Quaternized poly(4(5)-vinylimidazole), QPVI, was synthesized by methylating PVI using excess methyl iodide as a methylating agent in a concentrated solution of the polymer in methanol. See Overberger C. G.; Vorchheimer M. J. Am. Chem. Soc., 1963, 85, 951-955. The reaction took 16 hours to complete, and the compound was precipitated with acetone and collected by filtration. The compound was shown by elemental analysis to be roughly 60% quaternized. Polyvinylimidazoles and derivatives thereof were shown in Table II.

All polymer and buffer solutions were prepared using 18 MΩ water. Polymer solution concentrations were 1 mM or 10 mM (with respect to the monomer repeat unit) in sodium chloride salt (NaCl, Fisher).

EXAMPLE 2

Proteins Absorbed into and Released from PEMUs

Table V lists proteins used in the following examples to show the efficacy of the PEMUs of the present invention. The table includes the protein's pI and its charge at physiological pH 7.4. Bovine serum albumin (BSA) (fraction V powder, approx. 99%), fibrinogen (fraction I, type I-S from bovine plasma), lysozyme (from chicken egg white), pepsin (from porcine gastric mucosa), and □-chymotrypsinogen A (from bovine pancreas) were obtained from Sigma. For experiments requiring fluorescent probes, fluorescein isothiocyanate-albumin (FITC-albumin) from Sigma were used. Proteins were dissolved in TRIS buffer (pH 7.4) with a protein concentration of 1.0 mg/mL, or protein solutions were prepared by dissolving in 10 mM phosphate buffer to 1.0 mg/mL. This protein bulk concentration lies in the plateau region of the adsorption isotherm. Buffer ionic strength was adjusted by addition of sodium chloride. Protein solutions were filtered prior to use through a 0.45 μm nylon filter disc. All protein solutions were prepared in 18 MΩ water.

TABLE V

Proteins Absorbed/Released by PEMUs

| Protein/ Polyelectrolyte | Molecular weight, kDa | pI$^a$ | Net charge at pH 7.4 |
|---|---|---|---|
| BSA | 66.4 | 4.9 | − |
| Fibrinogen | 340 | 5.5 | − |
| Lysozyme | 14.3 | 11.4 | + |
| α-chymotrypsinogen | 25.6 | 8.97 | + |
| Pepsin | 34.6 | 2.20 | − |

EXAMPLE 3

Quantitative and Qualitative Methods of Analysis

The following are experimental methods for qualitative and quantitative analysis of PEMUs and thin film/charged molecule interactions. These methods are employed in the examples which follow.

Polyelectrolyte Multilayers on Si Wafers.

Polymers were deposited on silicon wafers (Si<100>, 0.5 mm thick, 1 inch diameter, undoped, polished on one side, Topsil Inc.) that were cleaned in 70% $H_2SO_4$ (conc.)/30% $H_2O_{2(aq)}$ ("piranha:" caution, piranha is a strong oxidizer and should not be stored in closed containers) then in hot $H_2O_2$/ammonia/water, 1:1:7 vol/vol, rinsed in water and blown dry with a stream of nitrogen. Sequential adsorption of polyelectrolytes was performed by hand dipping, or with the aid of a robot (nanoStrata Inc.), where the exposure time for the two polymers may be 5 minutes with three rinses of fresh distilled water, 1 minute each, between.

ATR-FTIR.

FTIR (Nicolet Nexus 470 FTIR) was used in attenuated total internal reflection mode (ATR, Specac Inc., flow cell of volume 0.49 mL) to monitor protein adsorption onto polyelectrolyte multilayers assembled on an ATR cell housing a 70 mm×10 mm×6 mm 45° germanium (Ge) crystal. Multilayer buildup was done by alternately filling the ATR cell with polymers (1 mM in 0.25 M NaCl), with intervening rinses in water. Solution pH for buildup, including rinse, with PAH was stabilized with TRIS buffer (pH 7.4). The exposure time for each solution was 10 minutes. Multilayers for ATR were not dried before protein adsorption. A multilayer spectral background in buffer was taken prior to protein adsorption. Layer-by-layer buildup and protein adsorption were monitored using areas of characteristic bands of interest (sulfonate stretch for PSS, $v(SO_3^-)$, at ~1033 cm$^{-1}$ and amide II band at ~1540 cm$^{-1}$). All spectra were recorded using 32 scans and 4 cm$^{-1}$ resolution. After addition of protein solution to the ATR cell, the protein spectrum was monitored with time until there were no further significant changes in spectra, the cell was rinsed with buffer, and amide II peaks were integrated. $H_2O$ spectra were subtracted from raw infrared spectra according to Chittur. See Chittur, K. K. *Biomaterials* 1998, 19, 357-369. The amounts of proteins were calculated based on calibration curves for each protein.

UV-Vis Spectroscopy.

UV-vis absorption spectra were recorded on quartz-supported multilayers using a Perkin Elmer UV/VIS/NIR spectrometer (Lambda 900). Fused quartz plates (2 mm thick, 1 inch diameter, GM Associates) were pretreated with "piranha" and then in $H_2O_2$/ammonia/water (1:1:7) then rinsed. Film thickness was estimated from multilayers deposited on the native $SiO_2$ layer (about 20 Å thick) on silicon wafers using the same conditions.

EXAMPLE 4

Developing Protein Calibration Curves Using ATR-FTIR

Figure 2:
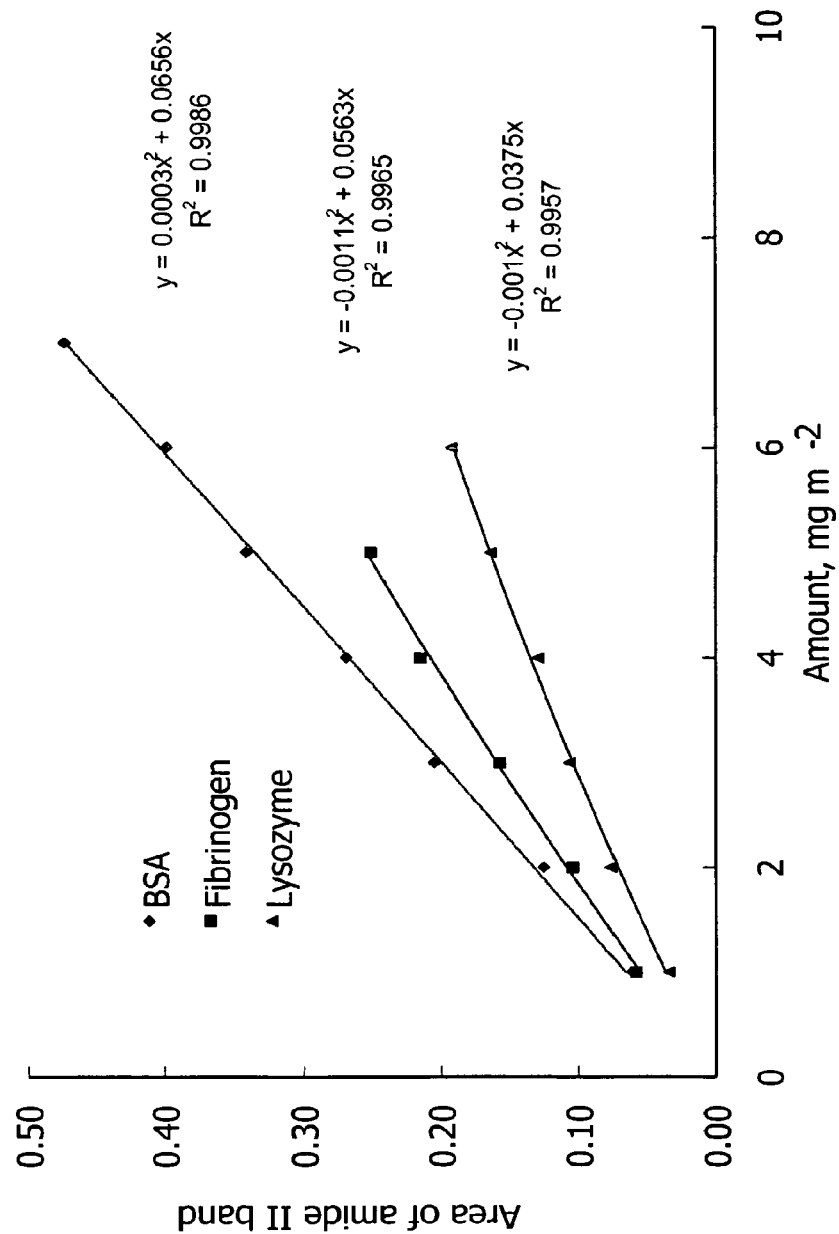
FIG. 2 is a calibration curve for proteins developed according to the protocol of example 4 by correlating the amide II (1550 cm$^{-1}$) band area with surface concentration amounts in mg/m$^2$.

Calibration curves using a PEMU comprising PM2VP and PSS were constructed using standard protein solutions with known concentration. Successive aliquots of protein solution in 50 μL water were added to the surface of the Ge Crystal that had 5 layers of PM2VP/PSS (to enhance wetting and uniform drying), and the aliquot was allowed to dry. Calibration curves (FIG. 2) were plotted by correlating the amide II band area (1550 cm$^{-1}$) with surface concentration amounts in mg/m$^2$ and fitting to a second degree polynomial function (best fit). This method was described by Chittur. See Chittur, K. K. *Biomaterials* 1998, 19, 357-369. The precision was ±0.2 mg/m$^2$ with an accuracy of 5%. Such a calibration procedure may be used in the following examples to determine protein concentration in PEMUs.

EXAMPLE 5

ATR-FTIR Monitoring of Protein Absorption and Release from Bare Ge Crystal

Figure 3:
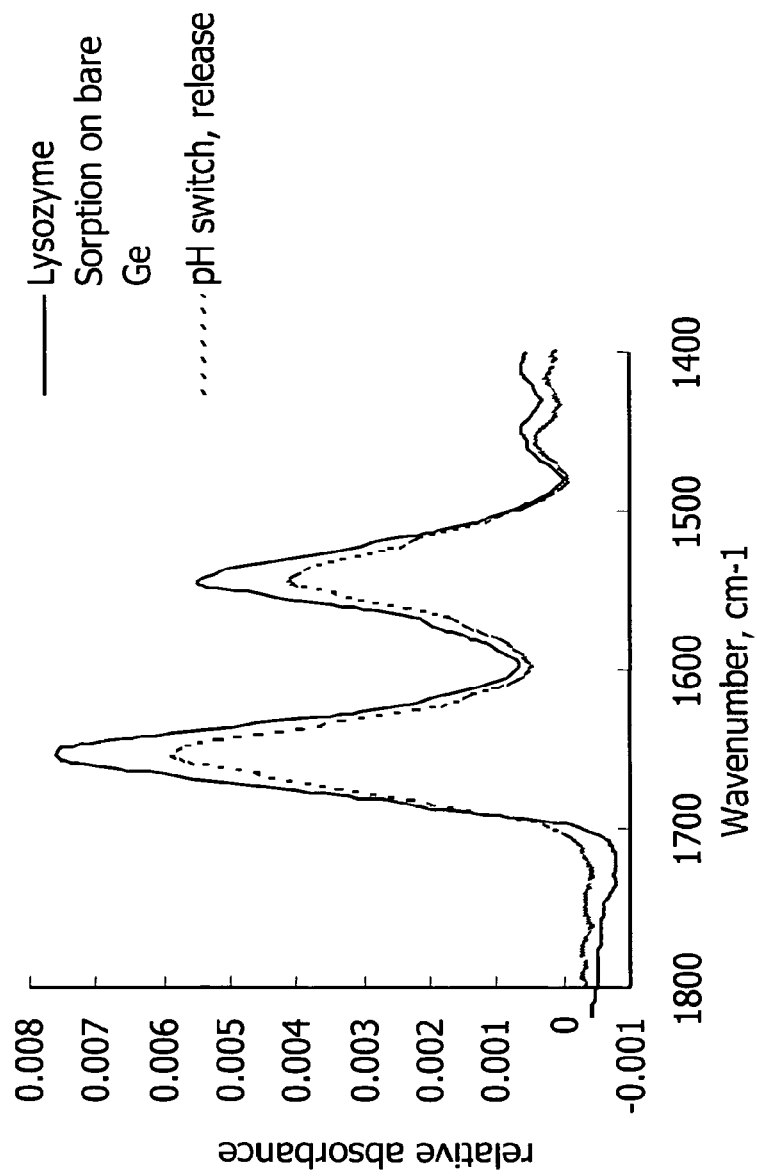
FIG. 3 shows lysozyme adsorption spectra on bare Ge before (solid line) and after (dotted line) pH switch. According to the protocol of example 5, adsorption of lysozyme (1 mg/mL) was carried out from 10 mM phosphate buffer solution (pH 7.4) and switching is done between pH 7.4 and 3.

FTIR (Nicolet Nexus 470 FTIR) was used in attenuated total internal reflection mode (ATR, Specac Inc., flow cell of volume 0.49 mL) to monitor adsorption and release of lysozyme from a bare 70 mm×10 mm×6 mm 45° germanium (Ge) crystal housed in an ATR cell. The adsorption of the protein was indicated by the appearance of amide peaks between 1500 and 1700 cm$^{-1}$. See FIG. 3 which shows the adsorption of lysozyme at pH 7.4 (solid line) and subsequent release at pH 3 (dotted line). As can be seen by the slight difference in peaks, very little lysozyme was released by the pH switch.

EXAMPLE 6

Buildup of Multilayers on Ge Crystal and Protein Loading Process

Multilayer buildup was done by alternately filling the ATR cell with polymers with intervening rinses in water. All polymer solutions were 1 mM each with respect to the monomer repeat unit and were dissolved in 10 mM phosphate buffer. Polymer solutions contained 0.25M NaCl for the layer-by-layer buildup. The exposure time for each solution was 10 minutes. For the copolymer blend/PSS system, (copolymer blend/PSS)$_3$copolymer blend @0.25 M NaCl @pH 3 was exposed to high pH (7.4) for charge reversal. For the QPVI/PSS and PM2VP/PSS systems, (QPVI/PSS)$_4$ and (PM2VP/PSS)$_4$ @0.25 M NaCl @pH 8.7, where the charge is negative, were exposed to pH 3 buffer for charge reversal. A multilayer spectral background in each buffer was taken prior to protein adsorption. All spectra were recorded using 32 scans and 4 cm$^{-1}$ resolution. After addition of protein solution to the ATR cell, the protein spectrum was monitored with time until there were no further significant changes in spectra, the cell was rinsed with buffer. Proteins were loaded from buffer solutions according to the charge. Basic proteins such as lysozyme and ☐-chymotrypsinogen were loaded from high pH where the charge of the PEMU coating is negative (opposite to the protein charge). Pepsin, an acidic protein, was loaded from low pH where the charge is positive.

Protein loading is achieved by exposing the PEMU film to the protein solution. This loading process is quick and the amount of proteins loaded depends on the exposure time. Protein loading time was 60 seconds followed by a buffer rinse to remove the loosely bound proteins.

EXAMPLE 7

ATR-FTIR Monitoring of Protein Absorption and Release from pH Insensitive PEMU

Figure 4:
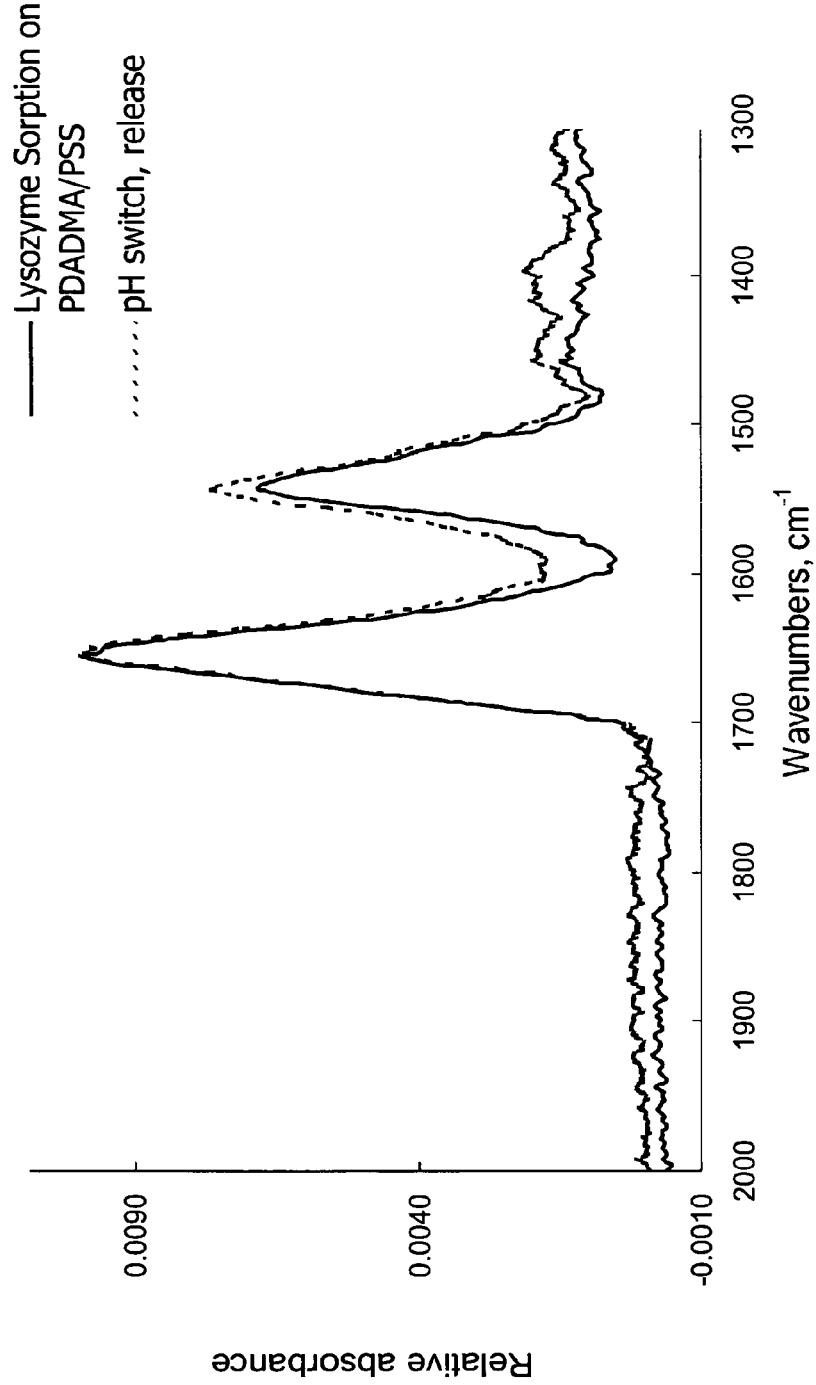
FIG. 4 shows a lysozyme absorption spectra on PDADMA/PSS before (solid line) and after (dotted line) switching between low and high pH. According to the protocol of example 7, absorption of lysozyme (1 mg/mL) was carried out from 10 mM phosphate buffer solution (pH 7.4) and switching is done between pH 7.4 and 3, with no change in protein peaks.

A control experiment was done by loading lysozyme on PDADMA/PSS system at pH 7.4 (solid line of FIG. 4), a non-pH sensitive multilayer. FIG. 4 shows that after pH switching to pH 3, the amount of protein is essentially the same before and after pH switch (dotted line).

EXAMPLE 8

Figure 5:
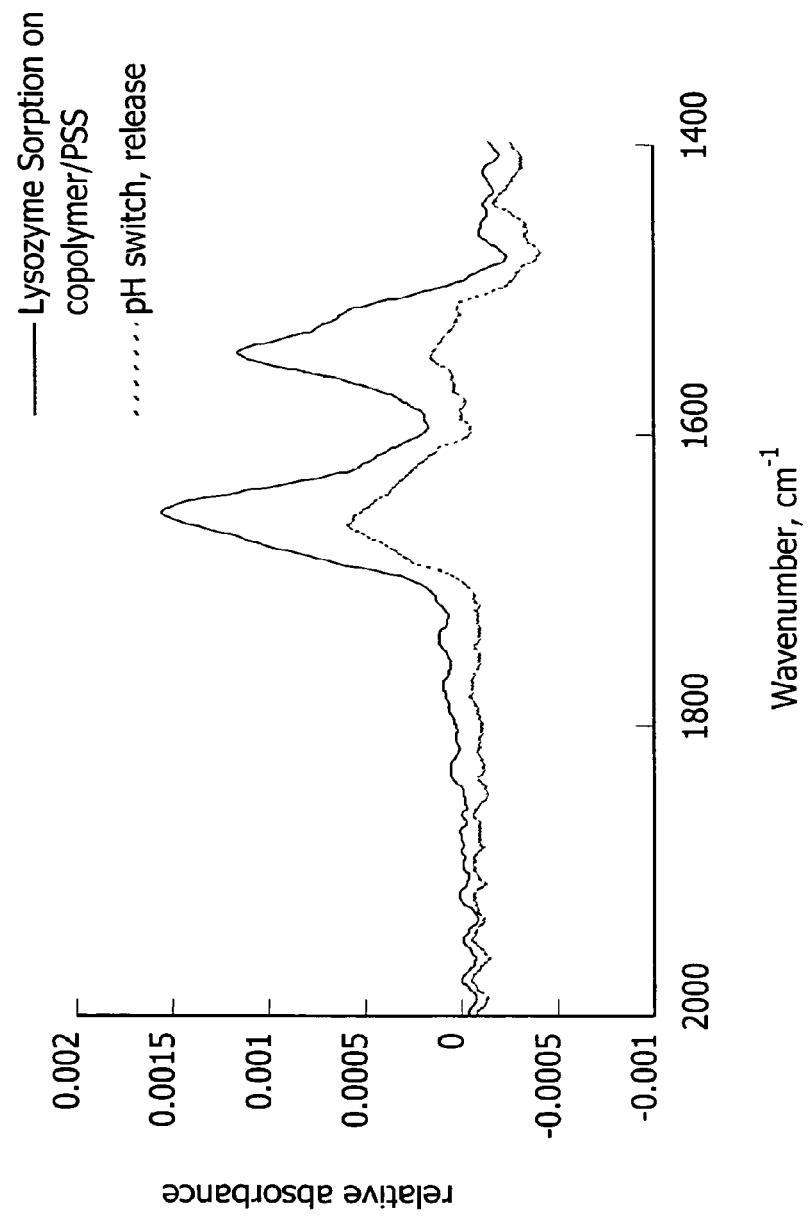
FIG. 5 shows a lysozyme absorption spectra on (copolymer blend/PSS)$_3$ copolymer blend before (solid line) and after (dotted line) pH switch. According to the protocol of example 8, absorption of lysozyme (1 mg/mL) was carried out from 10 mM phosphate buffer solution (pH 7.4) and switching is done between pH 7.4 and 3. Lysozyme release was 60±10%.

ATR-FTIR Monitoring of Lysozyme and ☐-Chymotrypsinogen a Absorption and Release from PEMU Comprising the Copolymer Blend/PSS 7 layers of copolymer blend/PSS were built from low pH (pH 3) to ensure that all the carboxylate groups in PAA were not involved in the buildup process. The multilayer was then exposed to pH 7.4 to reverse the charge. FIG. 5 shows lysozyme adsorption onto (copolymer blend/PSS)$_3$ copolymer blend at pH 7.4 (solid line). Lysozyme will be loaded into the multilayer since it has a positive charge at this pH which is opposite to the multilayer charge. As shown above, its positive charge causes the protein to be drawn into the entirety of the film. After loading the protein, the film was rinsed with pure buffer. Exposing the film to low pH (pH 3) and then high pH (pH 7.4) shows how the protein amount decreased due to lysozyme release (dotted line) from the multilayer, which is about 60±10% of the original amount.

☐-chymotrypsinogen A, a proenzyme from which chymotrypsin is made, was also tested using the copolymer blend system. Loading was done at pH 7.4 followed by a buffer rinse, then pH was switched to 3, followed by a pure low pH buffer rinse then high pH rinse. The release was 80±5%. In all our experiments we did not see additional changes in protein amount by going from the low pH rinse (for release) to the high pH rinse.

EXAMPLE 9

Figure 6:
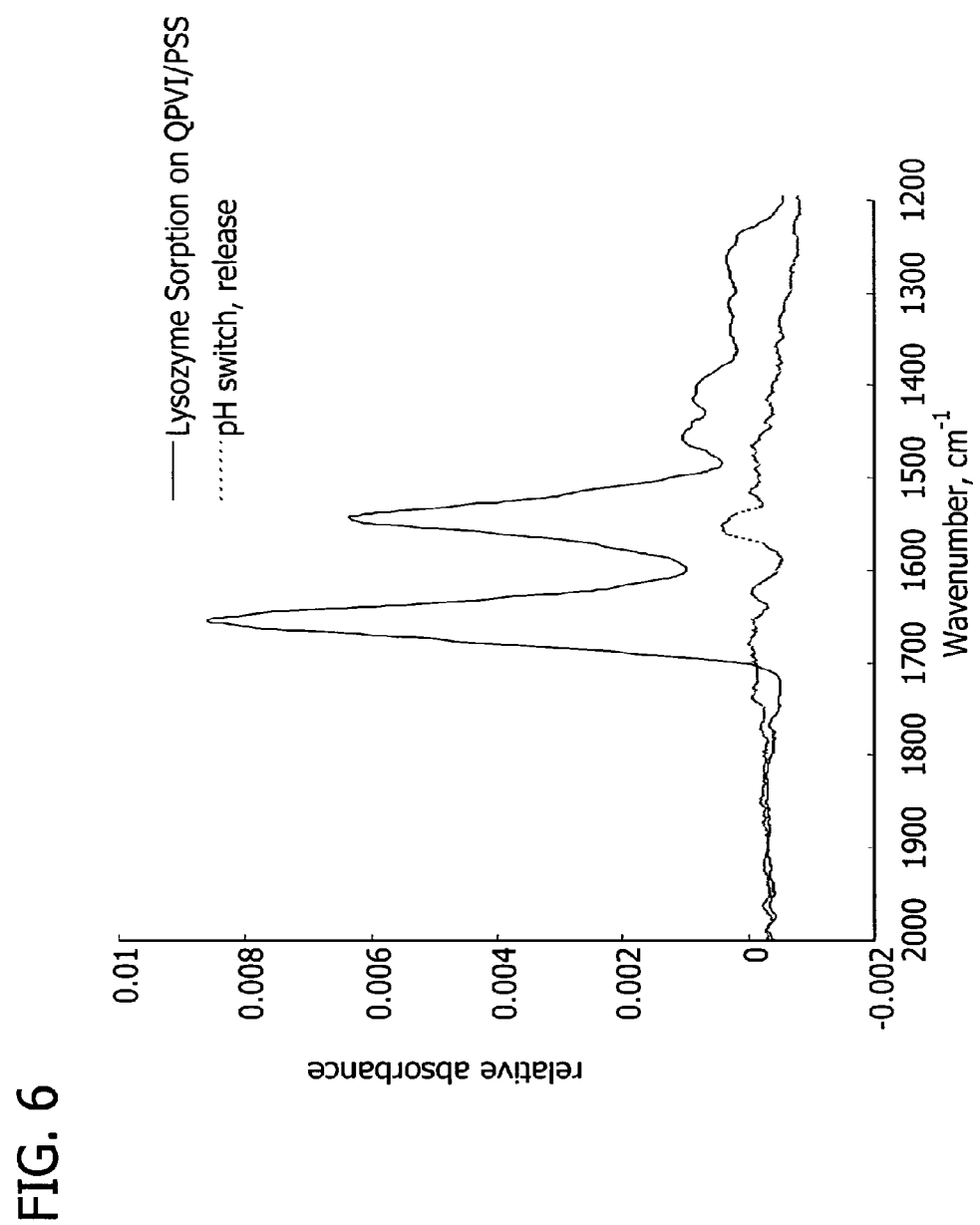
FIG. 6 shows a lysozyme absorption spectra on (QPVI/PSS)$_4$ before (solid line) and after (dotted line) pH switch. According to the protocol of example 9, absorption of lysozyme (1 mg/mL) was carried out from 10 mM phosphate buffer solution (pH 9) and switching is done between pH 9 and 3. Lysozyme release was more than 95%.
Figure 7:
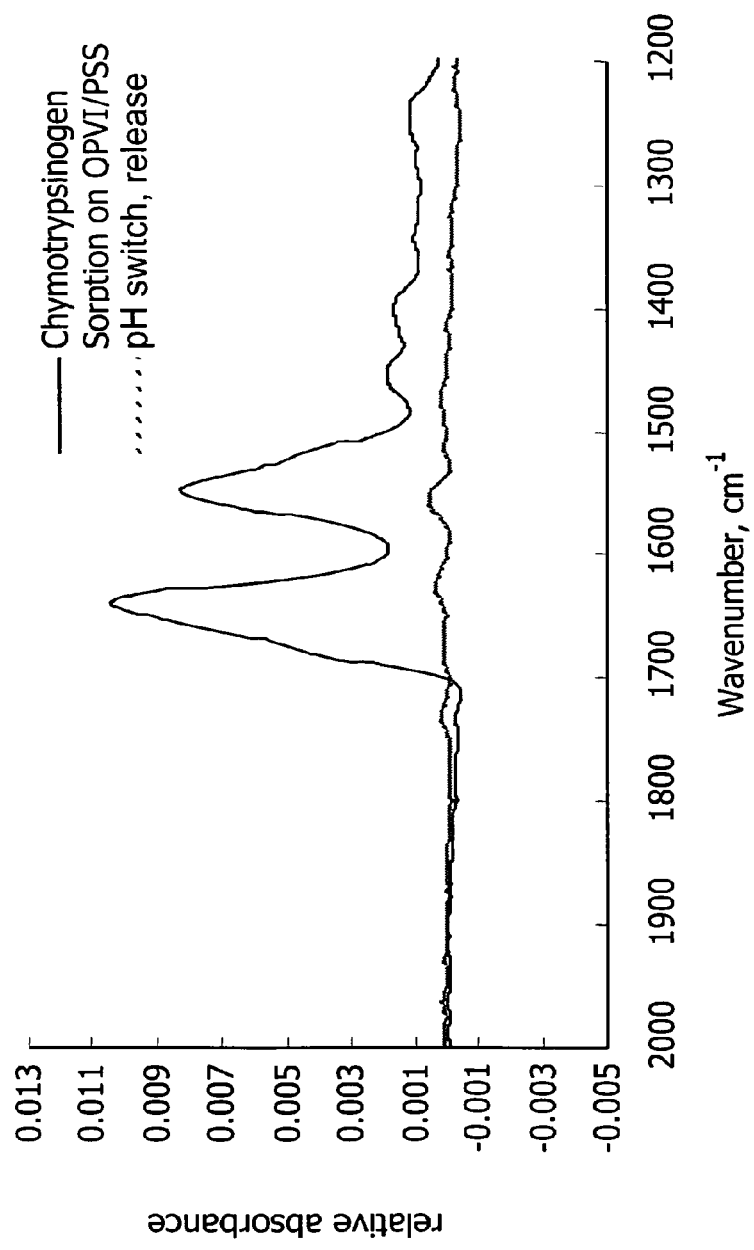
FIG. 7 shows an α-chymotrypsinogen absorption spectra on (QPVI/PSS)$_4$ before (solid line) and after (dotted line) pH switch. According to the protocol of example 9, absorption of α-chymotrypsinogen (1 mg/mL) was carried out from 10 mM phosphate buffer solution (pH 9) and switching is done between pH 9 and 3. α-chymotrypsinogen release was more than 95%.

ATR-FTIR Monitoring of Lysozyme and β-Chymotrypsinogen a Absorption and Release from PEMU Comprising QPVI/PSS QPVI, which is partially quaternized, has pH dependent segments that can also be used in this type of application. (QPVI/PSS)$_4$ was assembled at pH 9 which is slightly higher than the buffer used for copolymer blend system because QPVI has a higher pK$_a$ (nitrogen atoms in the imidazole group need to be deprotonated). Similarly, using the QPVI/PSS, lysozyme adsorption was done at pH 9 (solid line of FIG. 6) then release at pH 3 (dotted line of FIG. 6). The released amount was more than 95%. Under milder conditions, the release was also achieved at pH 7.4, which presents a smaller range in pH shift. β chymotrypsinogen A was also loaded (solid line of FIG. 7) and released (dotted line of FIG. 7) with similar results to lysozyme.

These pH sensitive multilayers selectively bind proteins according to the charge of the protein. In a classical IEC experiment, pH gradients change the charge on the protein, which eventually desorbs around its isoelectric point (pI). This method is effective for most of the proteins which have pIs around or slightly lower than neutral pH. Extreme pH changes need to be used with highly acidic or basic proteins, where the stability of the stationary phase is in question. The alternative, which is an object of this invention, is that pH is used to change the charge of the stationary phase instead of the charge on the protein. Swings in pH employed in the course of this invention may be limited such that they do not cross over the pI of the protein, thus the net charge on the protein does not reverse. Advantageously, any change in the magnitude of the charge in the protein is in a direction that favors enhanced repulsion with the multilayer components.

Two release strategies are encompassed by the multilayer systems described here. In the first approach, which uses the (copolymer blend/PSS) system, charges within the multilayer that have been relied on to attract a protein into the multilayer are removed by pH change. As the attractive forces are neutralized, the protein is "let go" by the multilayer. Alternatively, as in the (QPVI/PSS) system, internal multilayer charge of the same sign as the net charge on the protein is created by pH change. In this case, the force on the protein is actually repulsive and they are electrostatically ejected from the multilayer. It is seen that the "electrostatic ejection" with properly-designed multilayer compositions, leads to efficient removal of protein.

Using QPVI/PSS, we released lysozyme by creating a repelling charge (positive in this case), in addition to the protein slight positive charge increase, which is shown to be better than neutralizing the attractive forces-in the case of the copolymer blend—which is the same concept for IEC pH elution, changing the stationary phase charge instead. Creating positive charges works better than neutral in case of basic proteins. The fact that QPVI/PSS creates positive charge when switching to lower pH, similar to the protein net charge, makes it a better system for repelling proteins from the bulk. In the copolymer blend, negative charges are neutralized when going to lower pH which is not as effective compared to QPVI/PSS system. β-chymotrypsinogen release shows that QPVI/PSS system can be a universal surface for loading and releasing basic proteins.

EXAMPLE 10

Figure 8:
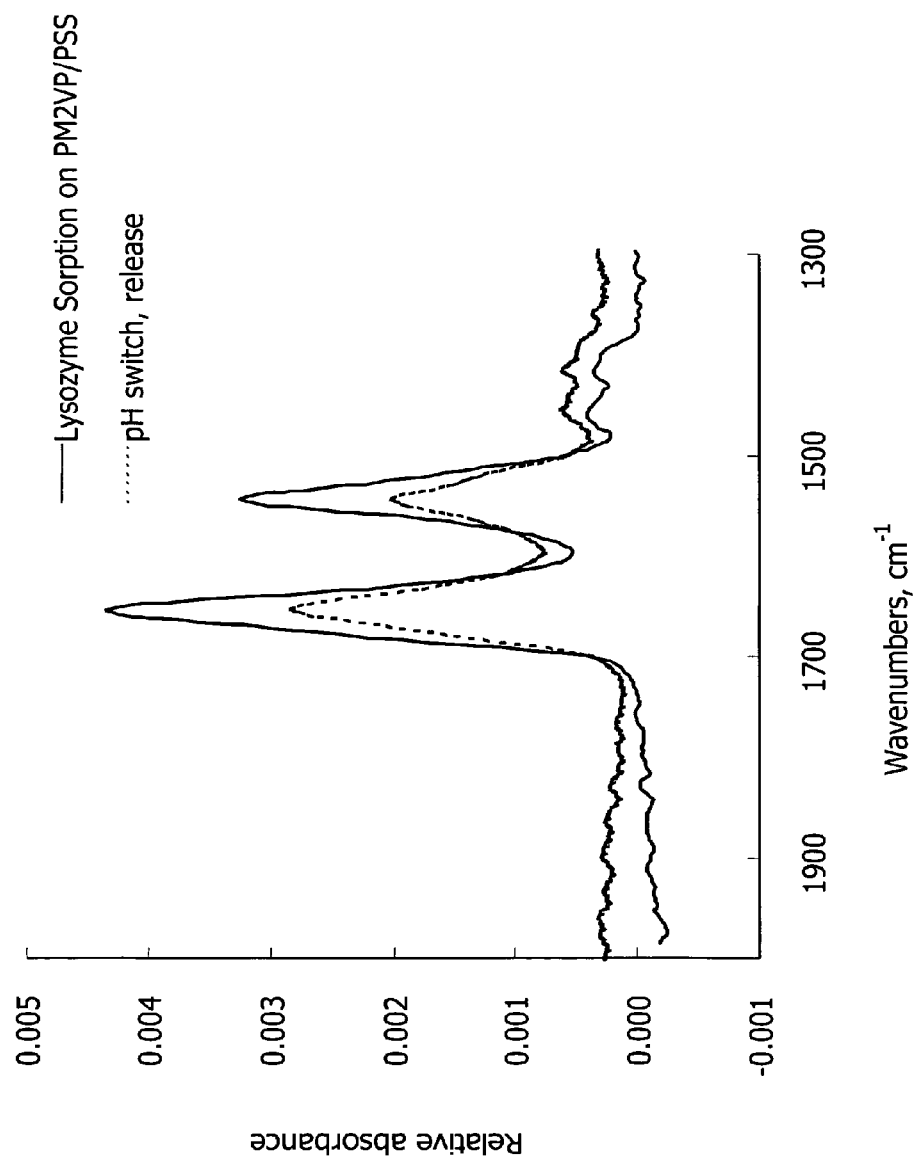
FIG. 8 shows a lysozyme absorption spectra on PM2VP/PSS before (solid line) and after (dotted line) switching between low and high pH. According to the protocol of example 10, absorption of lysozyme (1 mg/mL) was carried out from 10 mM phosphate buffer solution (pH 7.4) and switching is done between pH 7.4 and 3. Lysozyme release was 52+/−10%.

ATR-FTIR Monitoring of Lysozyme and β chymotrypsinogen A Absorption and Release from PEMU Comprising PM2VP/PSS Charge creation for releasing protein was also studied using PM2VP/PSS system. PM2VP/PSS resembles QPVI/PSS by creating a positive charge inside the multilayer when switching the pH. Lysozyme loading was carried out at high pH (solid line of FIG. 8) followed by a pH switch to release the sorbed protein (dotted line of FIG. 8). FIG. 8 shows the release was 52±10% of the original amount (less than QPVI/PSS). The enhanced performance of the QPVI/PSS system, as compared to the other alkylated polymer system PM2VP was unexpected. Both systems have nitrogens that are protonated during the course of the pH switch, yet QPVI was much more effective at releasing the protein. The reason for this is unknown, but may be related to a difference in hydrophobicity between the QPVI repeat unit and the PM2VP repeat unit. Therefore the use of QPVI polymer and copolymer is considered particularly advantageous for protein release.

EXAMPLE 11

Figure 9:
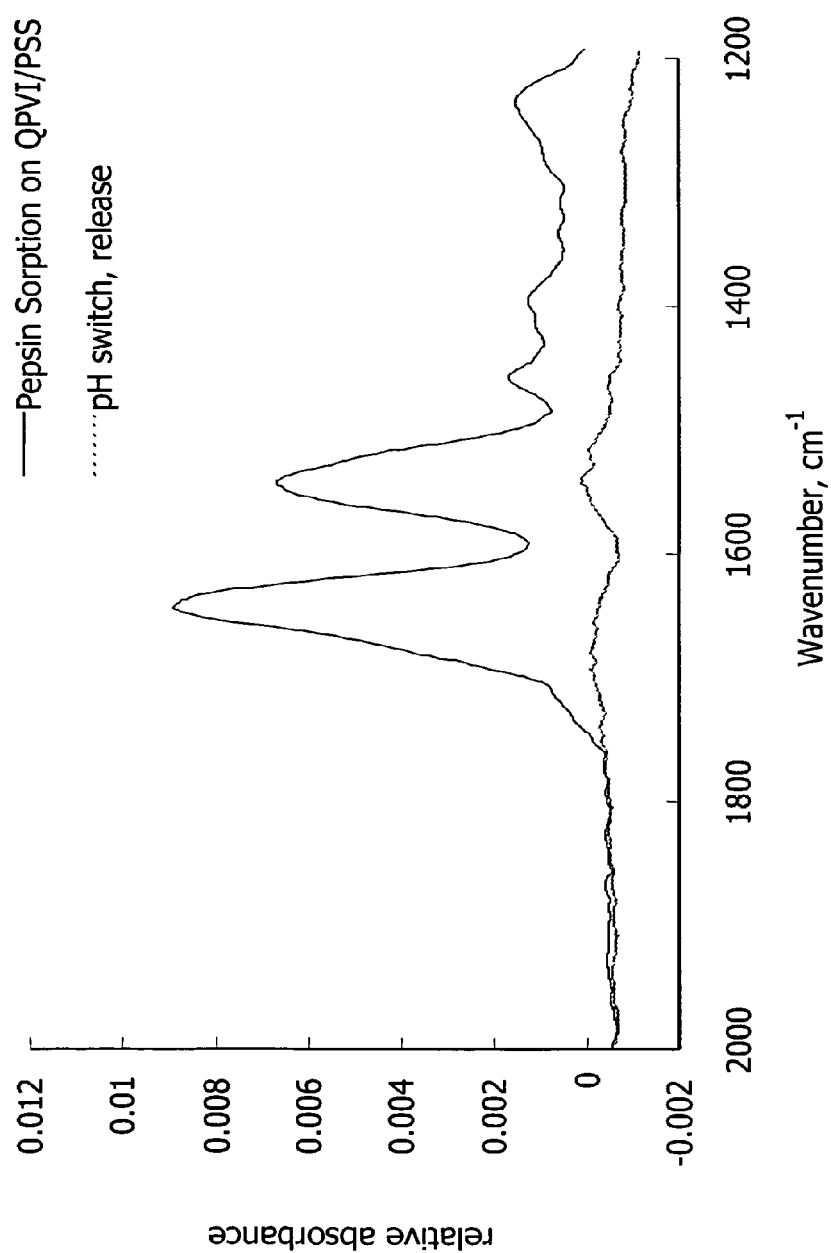
FIG. 9 shows a pepsin absorption spectra on (QPVI/PSS)$_4$ before (solid line) and after (dotted line) pH switch. According to the protocol of example 11, absorption of pepsin (1 mg/mL) was carried out from 10 mM phosphate buffer solution (pH 3) and switching is done between pH 3 and 9. Pepsin release was more than 95%.

ATR-FTIR Monitoring of Pepsin Absorption and Release from PEMU Comprising QPVI/PSS To test QPVI/PSS, the system that releases well, for acidic proteins, we did some experimental modifications. Pepsin, an acidic protein, was used to test for load/release concept. Pepsin is a larger protein than lysozyme and β chymotrypsinogen. Pepsin loading was done in this case at low pH (pH 3, solid line FIG. 9) where the charge is positive. Release, which was more than 90%, was achieved by switching to high pH (dotted line, FIG. 9).

EXAMPLE 12

PEMU for Ion-Exchange Chromatography Experiments

Figure 10:
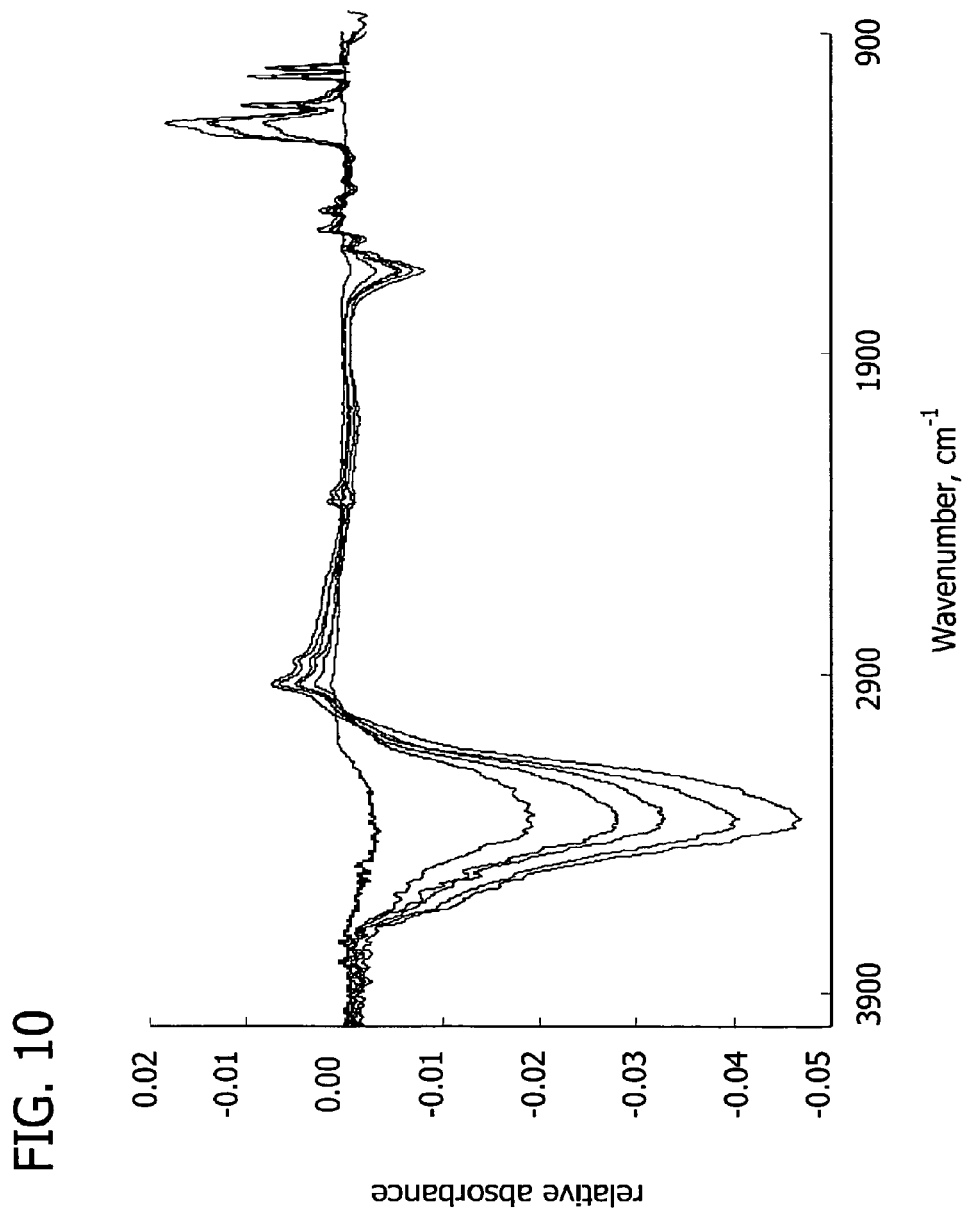
FIG. 10 shows buildup of (QPVI/PSS)$_4$ by ATR-FTIR according to the protocol of example 12.

The QPVI/PSS PEMU was used in an IEC experiment. Glass beads with an average diameter of 156 μm (A-Glass 2024, Spheriglass solid glass spheres, Potters Industries Inc.) were used as particulate support for multilayers. Using a sieve, particles smaller than 106 μm were removed. Beads were washed with nitric acid 0.1M (10 mL per 1 gram of beads) and heated at 90° C. for 2 hours. Beads were then washed and filtered with pure water until the pH of the filtrate was raised to neutral. (QPVI/PSS)$_4$ @0.25M NaCl @pH 8.2 (phosphate buffer) were deposited on the beads that were then stored in phosphate buffer overnight. See FIG. 10 for a graph showing QPVI/PSS buildup by ATR-FTIR. The coating time for each layer was 30 minutes followed by extensive rinse in buffer.

Figure 11:
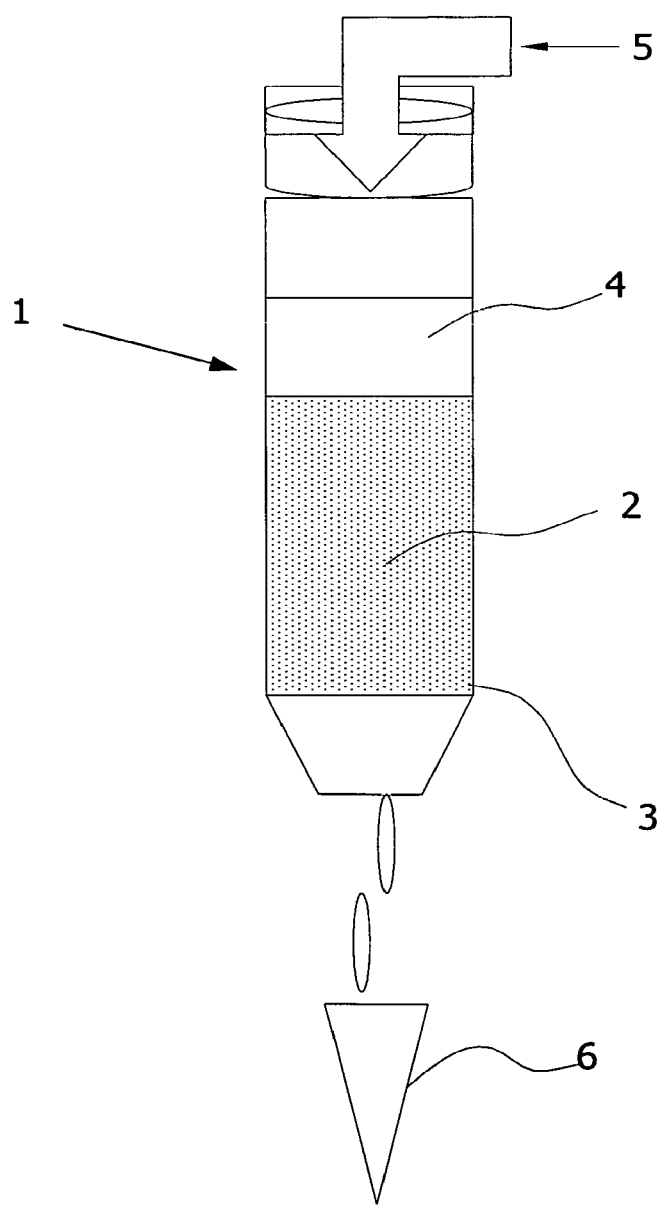
FIG. 11 is a schematic of the setup for a protein purification column, according to the protocol of example 12. The column was loaded with 0.6676 gram of stationary phase. A small layer of buffer above the surface was kept to even out irregularity. The flow rate through the column was 3 mL/min.

Referring now to FIG. 11, the chromatography column, generally designated 1, (BioRad) was loaded with 0.6676 g of coated beads 2, hereafter termed the "stationary phase" (~0.4 mL volume in the column). Loading was done by pouring the slurry into the column with no air bubbles, such that the beads rested on a wire mesh 3. Uneven flow onto the surface of the stationary phase can cause uneven patterns of flow through the column. A small layer of buffer 4 above the surface can help to even out irregularity. The flow rate through the column was 3 ml/min.

After equilibration in phosphate buffer (pH 8.2), 200 □l of lysozyme (1 mg/mL) was introduced into the head of the column 5 and left to adsorb for 5 minutes with no flow. Pure buffer was then passed through the column to elute the proteins that are not loaded or loosely bound on the resin coating surface. This was checked by collecting samples and testing it with the dye described below.

Phosphate buffer (pH 3.2) was then passed through to switch the pH in the column and release the proteins. 10 fractions 0.5 mL each were collected in a serial manner in a collector 6 and then dyed with Coomassie Brilliant Blue G-250 dye (BioRad), which changes color from hazy brown to blue in response to the presence of proteins. 200 μL of the pure dye was dissolved in 800 μL of pure water. 90 μL of this solution was added to 40 μL of the collected eluent after pH switch. The concentration of the protein in the eluents was examined by using UV spectrophotometer.

It was found that the adsorbed lysozyme was released after the pH switch and mainly collected in the first 2 mL. The concentration of these two eluent portions was found to be 0.03 mg/mL by UV spectroscopy. The total amount of proteins adsorbed on the column is roughly 0.03 mg. Thus the column capacity is 0.075 mg/mL of stationary phase (0.03 mg/0.4 mL).

Separate experiments showed the thickness (measured by Gaertner Scientific L116B Autogain ellipsometer) of (QPVI/PSS)$_4$ @0.25M NaCl @pH 8.2 multilayer is 70 nm. Thus the protein adsorption in active material only is 0.0364 mg/mg or 3.6 weight %. This represents the upper limit for protein loading in this particular system.

Compared with conventional IEC and chromatofocusing techniques, there are several advantages of this surface modification technique. First, the elution can be conducted by changing the charge state of the stationary phase instead of changing protein charging. This is especially useful when highly acidic or basic proteins are purified.

These pH-sensitive PEMU coatings can be used for purifying proteins with virtually any pI values. When the pI of the protein sample is lower/higher than the pH-of-zero-flow of the selected coating system, proteins can be loaded at pH between the pI and the pH-of-zero-flow, and then elution can be carried by increasing/decreasing pH across the pH-of-zero-flow point. Three pH-sensitive PEMU coating systems with different pH-of-zero-flow values were introduced in this work so that possible overlap of the pI and pH-of-zero-flow can be avoided by careful selection of the coating system according to the protein property.

A particular advantage of this invention, compared to the conventional pH elution technique, is that the release of adsorbed protein can be enhanced by a particular property of these pH-sensitive PEMU coatings: a so-called "double repulsion effect". The general feature of the system here is, for the pH-sensitive PEMU coatings, when the pH is above the pH-of-zero-flow (the point of surface neutrality), the higher the pH, the high the negative charge density. Below the pH-of-zero-flow, the lower the pH, the higher the positive charge density. For proteins a similar trend is followed: when the pH is above pI, the higher the pH, the higher the negative charge density; below pI, the lower the pH, the higher the positive charge density. In other words, the overall charge change (both polarity and density) of the protein via pH change is in the same direction as the change of the coating. In this case, as we increase/decrease the pH across the pH-of-zero-flow of the coating to alter the charge polarity and release the adsorbed "acidic" or "basic" proteins, the charge density of the proteins also changes in the same direction as the multilayer, so that a greater charge repulsion interaction will occur to better release the proteins.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A process for isolating an ionized component from a first aqueous composition, the process comprising contacting the first aqueous composition with a polyelectrolyte film to sorb the ionized component onto or into the polyelectrolyte film, wherein
the polyelectrolyte film comprises an interpenetrating network of a predominantly positively charged polymer and a predominantly negatively charged polymer, and
the predominantly positively charged polymer, the predominantly negatively charged polymer or both contain (i) a copolymer comprising a pH sensitive imidazole repeat unit having a pKa between 3 and 9 and a charged pH insensitive repeat unit, or (ii) a redox sensitive repeat unit selected from the group consisting of quaternized bipyridine repeat units, coordinated metal repeat units, pyrrole repeat units, aniline repeat units, thiophene repeat units and combinations thereof having a redox potential between +1.2 volts and −1.2 volts versus a standard hydrogen electrode.

2. The process of claim 1 wherein the polyelectrolyte film comprises said pH sensitive repeat unit, the ionized component is sorbed from the first aqueous composition onto or into the polyelectrolyte film at a first pH, and the sorbed ionized component is desorbed from the polyelectrolyte film into a second aqueous composition at a second pH, wherein the composition of the second aqueous composition differs from the composition of the first aqueous material, and the difference between the first and second pHs is at least 0.5 pH units.

3. The process of claim 1 wherein the polyelectrolyte film comprises said redox sensitive repeat unit, the ionized component is sorbed from the first aqueous composition onto or into the polyelectrolyte film at a first applied potential, and the sorbed ionized component is desorbed from the polyelectrolyte film into a second aqueous material at a second applied potential, wherein the composition of the second aqueous composition differs from the composition of the first aqueous composition and the difference between the first and second applied potentials is at least 0.1 volts.

4. The process of claim 2 wherein the first aqueous composition is an aqueous solution and the ionized component is dissolved therein.

5. The process of claim 4 wherein the dissolved ionized component is a dissolved ionic organic component.

6. The process of claim 5 wherein the dissolved ionic organic component is selected from the group consisting of polypeptides, nucleic acids, proteins, enzymes, polysaccharides, small organic molecules, and coordination complexes.

7. The process of claim 2 wherein the ionized component is an ionized particle selected from the group consisting of viruses, viral fragments, cells, cell fragments, and peptide conjugates.

8. The process of claim 3 wherein the ionized component is an ionized particle selected from the group consisting of viruses, viral fragments, cells, cell fragments, and peptide conjugates.

9. The process of claim 3 wherein the first aqueous composition is an aqueous solution and the ionized component is dissolved therein.

10. The process of claim 9 wherein the dissolved ionized component is a dissolved ionized organic component.

11. The process of claim 1 wherein
the predominantly positively charged polymer, the predominantly negatively charged polymer or both contain the pH sensitive imidazole repeat unit; and
the polyelectrolyte film is on a porous substrate.

12. The process of claim 1 wherein
the predominantly positively charged polymer, the predominantly negatively charged polymer or both contain the redox sensitive repeat unit; and
the polyelectrolyte film is on an electrically conductive substrate.

13. The process of claim 1 wherein
the predominantly positively charged polymer, the predominantly negatively charged polymer or both contain said copolymer comprising the pH sensitive imidazole repeat unit having the pKa between 3 and 9 and the charged pH insensitive repeat unit, and
the imidazole repeat unit has the structure:

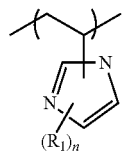

wherein each $R_1$ is independently optionally substituted alkyl, aryl, alkaryl, or heterocyclo, and n is 0 to 2.

14. The process of claim 1 wherein
the predominantly positively charged polymer, the predominantly negatively charged polymer or both contain said redox sensitive quaternized bipyridine repeat units, and
the quaternized bipyridine repeat units have the structure:

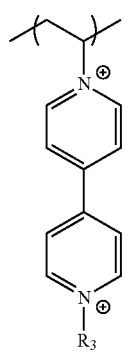

-continued

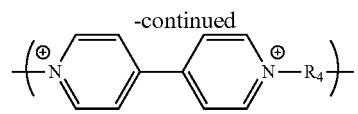

wherein $R_3$ and $R_4$ are optionally substituted alkyl, aryl, alkaryl, or heterocyclo.

15. The process of claim 1 wherein
the predominantly positively charged polymer, the predominantly negatively charged polymer or both contain said coordinated metal repeat unit.

16. The process of claim 1 wherein
the predominantly positively charged polymer, the predominantly negatively charged polymer or both contain said coordinated metal repeat unit, and
the coordinated metal repeat unit has the structure:

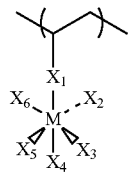

wherein M is osmium, ruthenium, cobalt or iron, and $X_1$ to $X_6$ are independently pyridine, bipyridine, terpyridine, nitrile, aceyl acetonate, trisbipyridyl, pyridine carboxylate, pyrazine carboxylate, imidazole or vacant.

17. The process of claim 1 wherein
the predominantly positively charged polymer, the predominantly negatively charged polymer or both contain said coordinated metal repeat unit, and the coordinated metal repeat unit comprises ferrocene or a derivative thereof.

18. The process of claim 1 wherein
the predominantly positively charged polymer, the predominantly negatively charged polymer or both contain said pyrrole repeat units, and
the pyrrole repeat units have the structure:

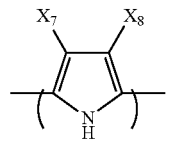

wherein $X_7$ and $X_8$ are independently hydrogen, or optionally substituted alkyl or alkoxy.

19. The process of claim 1 wherein
the predominantly positively charged polymer, the predominantly negatively charged polymer or both contain said aniline repeat units, and
the aniline repeat units have the structure:

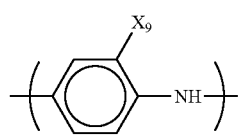

wherein $X_9$ is hydrogen, $SO_3^-$ or optionally substituted alkyl or alkoxy.

20. The process of claim 1 wherein
the predominantly positively charged polymer, the predominantly negatively charged polymer or both contain said thiophene repeat units, and
the thiophene repeat units have the structure:

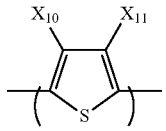

wherein $X_{10}$ and $X_{11}$ are independently hydrogen, or optionally substituted alkyl or alkoxy.

\* \* \* \* \*